US011363202B2

(12) United States Patent
Wang

(10) Patent No.: US 11,363,202 B2
(45) Date of Patent: Jun. 14, 2022

(54) METHODS AND SYSTEMS FOR VIDEO STABILIZATION

(71) Applicant: ZHEJIANG DAHUA TECHNOLOGY CO., LTD., Zhejiang (CN)

(72) Inventor: Tingniao Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/645,321

(22) Filed: Dec. 21, 2021

(65) Prior Publication Data
US 2022/0116539 A1    Apr. 14, 2022

Related U.S. Application Data

(63) Continuation of application No. PCT/CN2019/130004, filed on Dec. 30, 2019.

(30) Foreign Application Priority Data

Jul. 5, 2019 (CN) .......................... 201910606441.9

(51) Int. Cl.
G06F 17/11      (2006.01)
H04N 5/232     (2006.01)

(52) U.S. Cl.
CPC ......... *H04N 5/23267* (2013.01); *G06F 17/11* (2013.01); *H04N 5/23254* (2013.01)

(58) Field of Classification Search
CPC ........... H04N 5/23267; H04N 5/23264; H04N 5/23248; H04N 5/232; H04N 5/225;
(Continued)

(56) References Cited

U.S. PATENT DOCUMENTS

| 8,860,825 | B2 | 10/2014 | Grundmann et al. | |
| 8,879,850 | B2* | 11/2014 | Hsu | G06T 7/246 382/201 |
| 2008/0246848 | A1* | 10/2008 | Tsubaki | H04N 5/23264 348/208.4 |
| 2013/0100303 | A1* | 4/2013 | Tsai | G06T 7/246 348/208.1 |

(Continued)

FOREIGN PATENT DOCUMENTS

| CN | 102169573 A | 8/2011 |
| CN | 105872370 A | 6/2016 |

(Continued)

OTHER PUBLICATIONS

International Search Report in PCT/CN2019/130004 dated Apr. 3, 2020, 4 pages.

(Continued)

*Primary Examiner* — Mohamed Charioui
(74) *Attorney, Agent, or Firm* — Metis IP LLC

(57) ABSTRACT

A method for video stabilization may include obtaining a target frame of a video; dividing a plurality of pixels of the target frame into a plurality of pixel groups; determining a plurality of first feature points in the target frame; determining first location information of the plurality of first feature points in the target frame; determining second location information of the plurality of first feature points in a frame prior to the target frame in the video; obtaining a global homography matrix; determining an offset of each of the plurality of first feature points; determining a fitting result based on the first location information and the offsets; for each of the plurality of pixel groups, determining a correction matrix; and for each of the plurality of pixel groups, processing the pixels in the pixel group based on the global homography matrix and the correction matrix.

20 Claims, 14 Drawing Sheets

(58) Field of Classification Search
CPC ............ H04N 5/00; H04N 5/228; H04N 5/21;
H04N 21/414; H04N 7/18; H04N
5/23254; G06F 17/10; G06F 17/00; G06F
17/11
See application file for complete search history.

(56) References Cited

U.S. PATENT DOCUMENTS

2015/0139532 A1    5/2015   Kim et al.
2016/0112701 A1    4/2016   Chao et al.
2017/0332018 A1*  11/2017   Bell ..................... G06T 3/0093

FOREIGN PATENT DOCUMENTS

| CN | 106780370 A | 5/2017 |
|---|---|---|
| CN | 107749987 A | 3/2018 |
| CN | 108377320 A | 8/2018 |
| CN | 109327712 A | 2/2019 |
| CN | 109905565 A | 6/2019 |
| CN | 110415186 A | 11/2019 |
| EP | 2747416 A2 | 6/2014 |

OTHER PUBLICATIONS

Written Opinion in PCT/CN2019/130004 dated Apr. 3, 2020, 5 pages.
First Office Action in Chinese Application No. 201910606441.9 dated Apr. 22, 2021, 9 pages.
Liu, Shuaicheng et al., Bundled Camera Paths for Video Stabilization, ACM Transactions on Graphics, 32(4):1-10. 2013.

* cited by examiner

No Change

Translation

Enlargement

1100

Dividing the plurality of pixel groups into a plurality of sections, each of the plurality of sections corresponding to a boundary line, the boundary line being one of the plurality of pixel groups — 1110

For each of the boundary lines, determining a first correction matrix based on the fitting result — 1120

For each of the plurality of pixel groups excluding the boundary lines, determining a second correction matrix based on the first correction matrix of the boundary line adjacent to the pixel group — 1130

FIG. 11

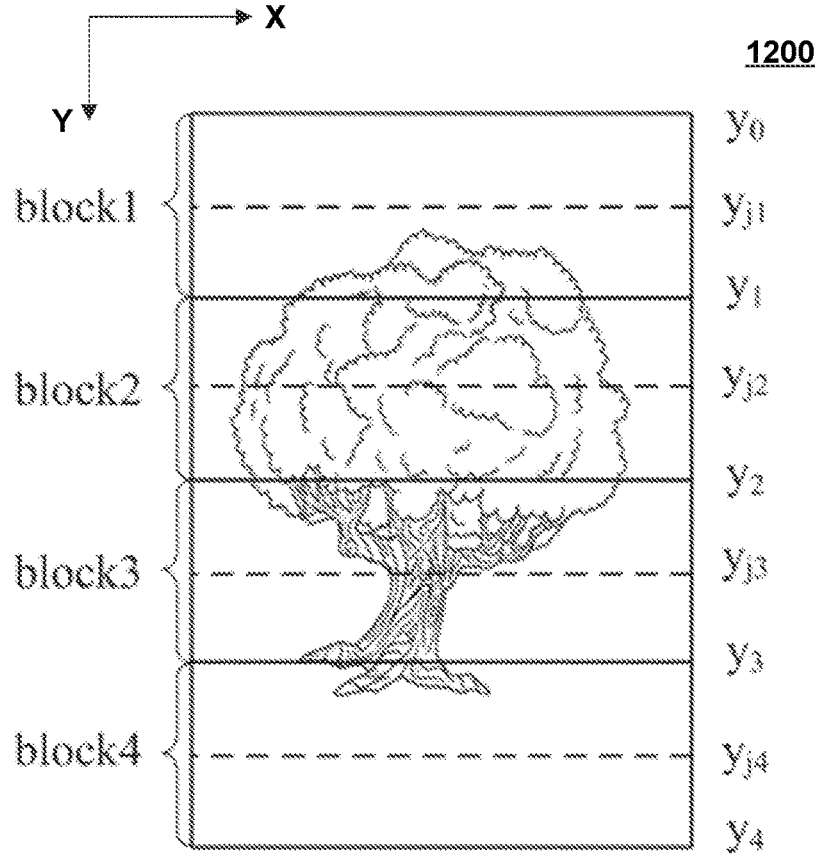

```
┌─────────────────────────────────────────────────┐ 1601
│ Dividing a target frame into N sections based   │
│ on an imaging direction of the target frame     │
└─────────────────────────────────────────────────┘
                        ↓
┌─────────────────────────────────────────────────┐ 1603
│ Determining K feature points in the target       │
│ frame, tracking coordinates of the K feature     │
│ points in a frame prior to the target frame,     │
│ selecting m of the K feature points, and         │
│ determining a global homography matrix $H_g$     │
│ based on the m feature points                    │
└─────────────────────────────────────────────────┘
                        ↓
┌─────────────────────────────────────────────────┐ 1605
│ Determining an offset of each of a plurality of  │
│ pixels in the target frame based on              │
│ $[Vx\ Vy\ 0]^T = P_2 - H_g * P_3$                │
└─────────────────────────────────────────────────┘
                        ↓
┌─────────────────────────────────────────────────┐ 1607
│ Determining a fitting result by performing curve │
│ fitting to a plurality of first discrete points  │
│ and a plurality of second discrete points        │
└─────────────────────────────────────────────────┘
                        ↓
┌─────────────────────────────────────────────────┐ 1609
│ Determining a first correction matrix for each   │
│ of a plurality of boundary lines by performing   │
│ linearization to a portion of the fitting result │
│ corresponding to each of a plurality of blocks   │
└─────────────────────────────────────────────────┘
                        ↓
┌─────────────────────────────────────────────────┐ 1611
│ For each of the plurality of pixel groups        │
│ excluding the plurality of boundary lines,       │
│ determining a second correction matrix by        │
│ determining a weighted average of the first      │
│ correction matrixes of the boundary lines        │
│ adjacent to the pixel group based on a distance  │
│ between the pixel group and the boundary lines   │
│ adjacent to the pixel group                      │
└─────────────────────────────────────────────────┘
                        ↓
┌─────────────────────────────────────────────────┐ 1613
│ For each of the plurality of pixel groups,       │
│ determining a correction homography matrix       │
│ based on the global homography matrix $H_g$ and  │
│ the correction matrix                            │
└─────────────────────────────────────────────────┘
                        ↓
┌─────────────────────────────────────────────────┐ 1615
│ For each of the plurality of pixel groups,       │
│ correcting the pixels in the pixel group based   │
│ in the correction homography matrix              │
└─────────────────────────────────────────────────┘
```

FIG. 16

METHODS AND SYSTEMS FOR VIDEO STABILIZATION

CROSS-REFERENCE TO RELATED APPLICATIONS

This application is a continuation of International Application No. PCT/CN2019/130004, filed on Dec. 30, 2019, which claims priority of Chinese Patent Application No. 201910606441.9 filed on Jul. 5, 2019, the contents of each of which are hereby incorporated by reference in its entirety.

TECHNICAL FIELD

The present disclosure generally relates to image processing, and more specifically relates to methods and systems for video stabilization.

BACKGROUND

Video stabilization techniques refer to the removal of undesired unintentional motion due to the actual motion of a camera, so that the video acquired by the camera will be visually smoothed, reducing the frame-to-frame jitter of the video due to the unintentional motion. The existing video stabilization methods fall into two categories: optical video stabilization and electronic video stabilization. In the optical video stabilization, a device inside the camera detects the camera's vibration, and then the position of the lens inside the camera is adjusted to achieve the video stabilization. In the electronic video stabilization, images and/or videos acquired by the camera are processed by an electronic means to reduce the impact of the camera's vibration on the acquired images and/or videos. There are many electronic video stabilization methods. One way is to sense the vibration of the camera through sensors such as a gyroscope to sense the shaking of the camera. Another way is to fix the shaky images and/or videos via image processing in post-production to stabilize the video. The optical video stabilization and the electronic video stabilization via sensors incur higher cost with less flexibility, while performing image processing on the acquired images and/or videos to achieve the video stabilization is complicated and time-consuming. Therefore, it is desirable to provide methods and/or system for video stabilization to solve at least one of the above problems.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to an aspect of the present disclosure, a system for video stabilization may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain a target frame of a video. The target frame may include a plurality of pixels arranged in rows and columns. The one or more processors may divide the plurality of pixels into a plurality of pixel groups based on an imaging direction of the target frame. The one or more processors may determine a plurality of first feature points in the target frame. The one or more processors may determine first location information of the plurality of first feature points in the target frame. The one or more processors may determine second location information of the plurality of first feature points in a frame prior to the target frame in the video. The one or more processors may obtain a global homography matrix. The one or more processors may determine an offset of each of the plurality of first feature points based on the global homography matrix, the first location information, and the second location information. The one or more processors may determine a fitting result by performing curve fitting based on the first location information and the offsets of the plurality of first feature points. The one or more processors may determine, for each of the plurality of pixel groups, a correction matrix based on the fitting result. The one or more processors may process, for each of the plurality of pixel groups, the pixels in the pixel group based on the global homography matrix and the correction matrix.

In some embodiments, to determine the offset of the each of the plurality of first feature points based on the global homography matrix, the first location information, the one or more processors may perform affine transformation to the first location information of the first feature point based on the global homography matrix. The one or more processors may determine the offset of the first feature point based on the transformed first location information of the first feature point and the second location information of the first feature point.

In some embodiments, to determine, for each of the plurality of pixel groups, the correction matrix based on the fitting result, the one or more processors may divide the plurality of pixel groups into a plurality of sections, each of the plurality of sections corresponding to a boundary line. The boundary line may be one of the plurality of pixel groups. For each of the boundary lines, the one or more processors may determine a first correction matrix based on the fitting result. For each of the plurality of pixel groups excluding the boundary lines, the one or more processors may determine a second correction matrix based on the first correction matrix of the boundary line adjacent to the pixel group.

In some embodiments, the offset of the first feature point may include a row offset and a column offset, and the first location information of each of the plurality of first feature points may include a row coordinate and a column coordinate.

In some embodiments, the imaging direction of the target frame may relate to row imaging along a column direction of the target frame, and each of the plurality of pixel groups may include a row of pixels of the plurality of pixels in the target frame.

In some embodiments, to determine the fitting result by performing curve fitting based on the first location information and the offsets of the plurality of first feature points, the one or more processors may determine a first polynomial curve equation by performing first curve fitting based on the row coordinates and the row offsets of the plurality of first feature points. The one or more processors may determine a second polynomial curve equation by performing second curve fitting based on the row coordinates and the column offsets of the plurality of first feature points. The fitting result may include the first polynomial curve function and the second polynomial curve function.

In some embodiments, for each of the boundary lines, to determine the first correction matrix based on the fitting result, the one or more processors may determine a first set of parameters related to the boundary line based on the first polynomial curve equation. The first set of parameters may indicate a linear relation in the first polynomial curve equation between the row coordinates and the row offsets of the first feature points that are located in the boundary line. The one or more processors may determine a second set of parameters related to the boundary line based on the second polynomial curve equation. The second set of parameters may indicate a linear relation in the second polynomial curve equation between the row coordinates and the column offsets of the first feature points that are located in the boundary line. The one or more processors may determine the first correction matrix of the boundary line based on the first set of parameters and the second set of parameters.

In some embodiments, the imaging direction of the target frame may relate to column imaging along a row direction of the target frame, and each of the plurality of pixel groups may include a column of pixels of the plurality of pixels in the target frame.

In some embodiments, to determine the fitting result by performing curve fitting based on the first location information of the plurality of first feature points and the offsets of the plurality of first feature points, the one or more processors may determine a third polynomial curve equation by performing third curve fitting based on the column coordinates and the row offsets of the plurality of first feature points. The one or more processors may determine a fourth polynomial curve equation by performing fourth curve fitting based on the column coordinates and the column offsets of the plurality of first feature points. The fitting result may include the third polynomial curve function and the fourth polynomial curve function.

In some embodiments, for each of the one or more boundary lines, to determine the first correction matrix based on the fitting result, the one or more processors may determine a third set of parameters related to the boundary line based on the third polynomial curve equation. The third set of parameters may indicate a linear relation in the third polynomial curve equation between the column coordinates and the row offsets of the first feature points that are located in the boundary line. The one or more processors may determine a fourth set of parameters related to the boundary line based on the fourth polynomial curve equation. The fourth set of parameters may indicate a linear relation in the fourth polynomial curve equation between the column coordinates and the column offsets of the first feature points that are located in the boundary line. The one or more processors may determine the first correction matrix of the boundary line based on the third set of parameters and the fourth set of parameters.

In some embodiments, for each of the plurality of pixel groups excluding the boundary lines, to determine the second correction matrix based on the first correction matrix of the boundary line adjacent to the pixel group, the one or more processors may determine a distance between the pixel group and the boundary line adjacent to the pixel group. The one or more processors may determine a ratio between the distance and a count of pixels groups in the section including the pixel group. The one or more processors may determine the second correction matrix of the pixel group based on the ratio and the first correction matrix of the boundary line adjacent to the pixel group.

In some embodiments, to determine the fitting result by performing curve fitting based on the first location information and the offsets of the plurality of first feature points, the one or more processors may perform the curve fitting based on the first location information of the plurality of first feature points and the offsets of the plurality of first feature points using a fitting cost function.

In some embodiments, the fitting cost function may include a least square error function or the least square error function plus a regularization item.

In some embodiments, to obtain the global homography matrix, the one or more processors may determine a plurality of second feature points in the target frame, each of the plurality of second feature points having a corresponding feature point in the frame prior to the target frame. The one or more processors may determine third location information of the plurality of second feature points in the target frame. The one or more processors may determine fourth location information of the plurality of second feature points in the frame prior to the target frame. The one or more processors may determine the global homography matrix based on the third location information and the fourth location information.

In some embodiments, to process, for each of the plurality of pixel groups, the pixels in the pixel group based on the global homography matrix and the correction matrix, the one or more processors may determine, for each of the plurality of pixel groups, a correction homography matrix based on the global homography matrix and the correction matrix. The one or more processors may process the pixels in the pixel group based on the correction homography matrix.

According to another aspect of the present disclosure, a method for video stabilization may include one or more of the following operations. One or more processors may obtain a target frame of a video. The target frame may include a plurality of pixels arranged in rows and columns. The one or more processors may divide the plurality of pixels into a plurality of pixel groups based on an imaging direction of the target frame. The one or more processors may determine a plurality of first feature points in the target frame. The one or more processors may determine first location information of the plurality of first feature points in the target frame. The one or more processors may determine second location information of the plurality of first feature points in a frame prior to the target frame in the video. The one or more processors may obtain a global homography matrix. The one or more processors may determine an offset of each of the plurality of first feature points based on the global homography matrix, the first location information, and the second location information. The one or more processors may determine a fitting result by performing curve fitting based on the first location information and the offsets of the plurality of first feature points. The one or more processors may determine, for each of the plurality of pixel groups, a correction matrix based on the fitting result. The one or more processors may process, for each of the plurality of pixel groups, the pixels in the pixel group based on the global homography matrix and the correction matrix.

According to yet another aspect of the present disclosure, a system for video stabilization may include a section dividing module configured to obtain a target frame of a video. The target frame may include a plurality of pixels arranged in rows and columns. The section dividing module may be further configured to divide the plurality of pixels into a plurality of pixel groups based on an imaging direction of the target frame. The system may also include an offset determination module configured to determine a plurality of first feature points in the target frame. The offset determination module may be further configured to determine first location information of the plurality of first feature points in the target frame. The offset determination module may be further configured to determine second location information of the plurality of first feature points in a frame prior to the target frame in the video. The offset determination module may be further configured to obtain a global homography matrix. The offset determination module may be further configured to determine an offset of each of the plurality of first feature points based on the global homography matrix, the first location information, and the second location information. The system may also include a first determination module configured to determine a fitting result by performing curve fitting based on the first location information and the offsets of the plurality of first feature points. The first determination module may be further configured to determine, for each of the plurality of pixel groups, a correction matrix based on the fitting result. The system may also include a processing module configured to process, for each of the plurality of pixel groups, the pixels in the pixel group based on the global homography matrix and the correction matrix.

According to yet another aspect of the present disclosure, a non-transitory computer readable medium may comprise at least one set of instructions for video stabilization. The at least one set of instructions may be executed by one or more processors of a computer server. The one or more processors may obtain a target frame of a video. The target frame may include a plurality of pixels arranged in rows and columns. The one or more processors may divide the plurality of pixels into a plurality of pixel groups based on an imaging direction of the target frame. The one or more processors may determine a plurality of first feature points in the target frame. The one or more processors may determine first location information of the plurality of first feature points in the target frame. The one or more processors may determine second location information of the plurality of first feature points in a frame prior to the target frame in the video. The one or more processors may obtain a global homography matrix. The one or more processors may determine an offset of each of the plurality of first feature points based on the global homography matrix, the first location information, and the second location information. The one or more processors may determine a fitting result by performing curve fitting based on the first location information and the offsets of the plurality of first feature points. The one or more processors may determine, for each of the plurality of pixel groups, a correction matrix based on the fitting result. The one or more processors may process, for each of the plurality of pixel groups, the pixels in the pixel group based on the global homography matrix and the correction matrix.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 is a flowchart illustrating an exemplary process for determining a correction matrix for each of a plurality of pixel groups in a target frame according to some embodiments of the present disclosure;

FIG. 12 is a schematic diagram illustrating a plurality of exemplary sections in a target frame according to some embodiments of the present disclosure;

FIG. 16 is a flowchart illustrating an exemplary process for video stabilization according to some embodiments of the present disclosure.

DETAILED DESCRIPTION

Figure 1:
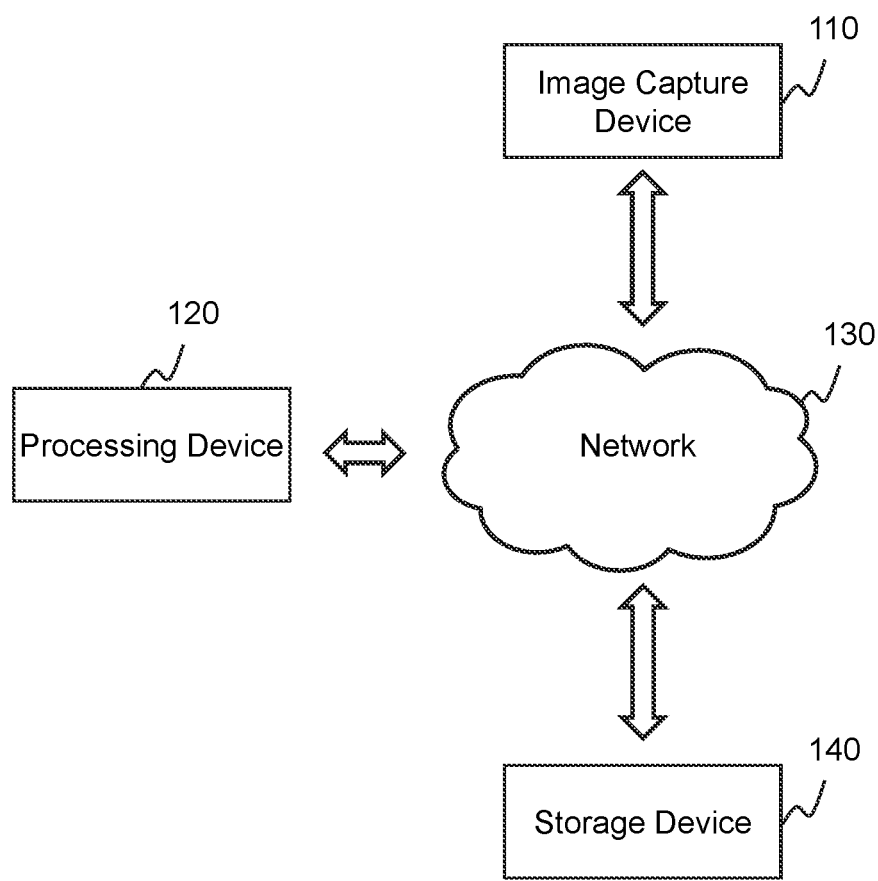
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expressions if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The present disclosure provides systems and/or methods for video stabilization to reduce or remove the rolling shutter effect in images and/or videos captured using rolling shutter. In the systems and/or methods for video stabilization provided in the present disclosure, a target frame may be obtained. The target frame may be divided into a plurality of pixel groups (e.g., a plurality of rows of pixels if an imaging direction of the target frame is a column direction of the target frame). An offset of each pixel in the target frame may be determined based on first location information of the pixel in the target frame and second location information of the corresponding pixel in a frame prior to the target frame. A fitting result may be determined by performing curve fitting to discrete points indicating the first location information and the offsets of the pixels in the target frame. For each of the plurality of pixel groups, a correction matrix may be determined based on the fitting result. For each of the plurality of pixel groups, a correction homography matrix may be determined based on the correction matrix and a global homography matrix. The pixels in the pixel group may be corrected based on the correction homography matrix.

Because the fitting result is obtained based on the first location information and the offsets of all pixels in the target frame, the relation between the first location information and the offset of a pixel indicated in the fitting result may be suitable for the entire target frame. Therefore, the correction matrix of each of the plurality pixel groups may be determined based on the fitting result. For each of the plurality of pixel groups, a correction homography matrix may be determined based on the correction matrix and a global homography matrix. The pixels in the pixel group may be corrected based on the correction homography matrix.

Further, the correction matrixes of a part of the plurality pixel groups (e.g., boundary lines) may be determined based on the fitting result. The correction matrix of the other pixel group may be determined based on the correction matrixes of the boundary lines and a distance between the other pixel group and the boundary lines.

In the systems and/or methods for video stabilization provided in the present disclosure, parameters that are needed to determine may be fewer, the operation amount may be reduced, the video stabilization may not be limited by application scenarios, the fineness of the video stabilization may be higher (e.g., each row of pixels in the target frame may correspond to a correction homography matrix), the video stabilization may be more effective, and the definition of the output video may be higher.

FIG. 1 is a schematic diagram illustrating an exemplary imaging system 100 according to some embodiments of the present disclosure. In some embodiments, at least part of the imaging system 100 may be implemented with an electronic device that needs to capture images or videos, for example, a digital camera, a video camera, a smartphone, a monitoring device, or the like. As illustrated in FIG. 1, the imaging system 100 may include an image capture device 110, a processing device 120, a network 130, and a storage device 140.

The image capture device 110 may be configured to capture images or videos. The images or videos may be two-dimensional (2D) or three-dimensional (3D). In some embodiments, the image capture device 110 may include a digital camera. The digital camera may include a 2D camera, a 3D camera, a panoramic camera, a virtual reality (VR) camera, a web camera, an instant picture camera, a video camera, a surveillance camera, or the like, or any combination thereof. In some embodiments, the image capture device 110 may include a stereo camera. The stereo camera may include a binocular vision device or a multi-camera. In some embodiments, the image capture device 110 may be added to or be part of a medical imaging equipment, a night-vision equipment, a radar equipment, a sonar equipment, an electronic eye, a camcorder, a thermal imaging equipment, a smartphone, a tablet PC, a laptop, a wearable equipment (e.g., 3D glasses), an eye of a robot, a vehicle traveling data recorder, an unmanned device (e.g., a unmanned aerial vehicle (UAV), a driverless car, etc.), a video gaming console, or the like, or any combination thereof.

In some embodiments, the image capture device 110 may communicate with one or more components (e.g., the processing device 120, or the storage device 140) of the image capture device 110 via the network 130. In some embodiments, the image capture device 110 may be directly connected to the one or more components (e.g., the processing device 120, or the storage device 140) of the image capture device 110.

The processing device 120 may process information and/or data to perform one or more functions described in the present disclosure. For example, the processing device 120 may perform video stabilization to images and/or videos captured by the image capture device 110.

In some embodiments, the processing device 120 may be a single server or a server group. The server group may be centralized, or distributed (e.g., the processing device 120 may be a distributed system). In some embodiments, the processing device 120 may be local or remote. For example, the processing device 120 may access/transmit information and/or data in/to the image capture device 110, or the storage device 140 via the network 130. As another example, the processing device 120 may be directly connected to the image capture device 110, or the storage device 140 to access/transmit information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 having one or more components illustrated in FIG. 2A in the present disclosure.

In some embodiments, the processing device 120 may be implemented on a mobile device, a tablet computer, a laptop computer, a built-in device in a motor vehicle, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle may include an onboard computer, an onboard television, a traveling data recorder, etc. In some embodiments, the processing device 120 may be implemented on a mobile device 300 having one or more components illustrated in FIG. 3 in the present disclosure.

In some embodiments, the processing device 120 may include one or more processing engines (e.g., single-core processing engine(s) or multi-core processor(s)). Merely by way of example, the processing device 120 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, at least a part of the processing device 120 may be included in the image capture device 110.

The network 130 may be configured to facilitate communications among the components (e.g., the image capture device 110, the processing device 120, and the storage device 140) of the imaging system 100. For example, the network 130 may transmit digital signals from the image capture device 110 to the processing device 120. As another example, the network 130 may transmit images and/or videos captured by the image capture device 110 to the storage device 140 and/or the processing device 120.

In some embodiments, the network 130 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The storage device 140 may be configured to store data and/or instructions. In some embodiments, the storage device 140 may store data obtained from the processing device 120 and/or the image capture device 110. For example, the storage device 140 may store images and/or videos generated by the processing device 120 and/or the image capture device 110. In some embodiments, the storage device 140 may store data and/or instructions that the processing device 120 may execute or use to perform exemplary methods described in the present disclosure. For example, the storage device 140 may store instructions that the processing device 120 may execute to perform video stabilization to the images and/or videos captured by the image capture device 110. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 130 to communicate with one or more components in the imaging system 100 (e.g., the image capture device 110 and the processing device 120). One or more components in the imaging system 100 may access the data or instructions stored in the storage device 140 via the network 130. In some embodiments, the storage device 140 may be directly connected to or communicate with one or more components in the imaging system 100 (e.g., the image capture device 110 and the processing device 120). In some embodiments, the storage device 140 may be part of the image capture device 110 and/or the processing device 120.

In some embodiments, two or more components of the imaging system 100 may be integrated in one device. For example, the image capture device 110, the processing device 120, and the storage device 140 may be integrated in one device (e.g., a camera, a smartphone, a laptop, a workstation, a server, etc.). In some embodiments, one or more components of the imaging system 100 may be located remote from other components. For example, the image capture device 110 may be installed at a location away from the processing device 120, which may be implemented in a single device with the storage device 140.

It should be noted that the component of the imaging system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field-programmable gate array, a programmable logic device, a software performed by various processors, or a combination thereof (e.g., firmware).

Figure 2A:
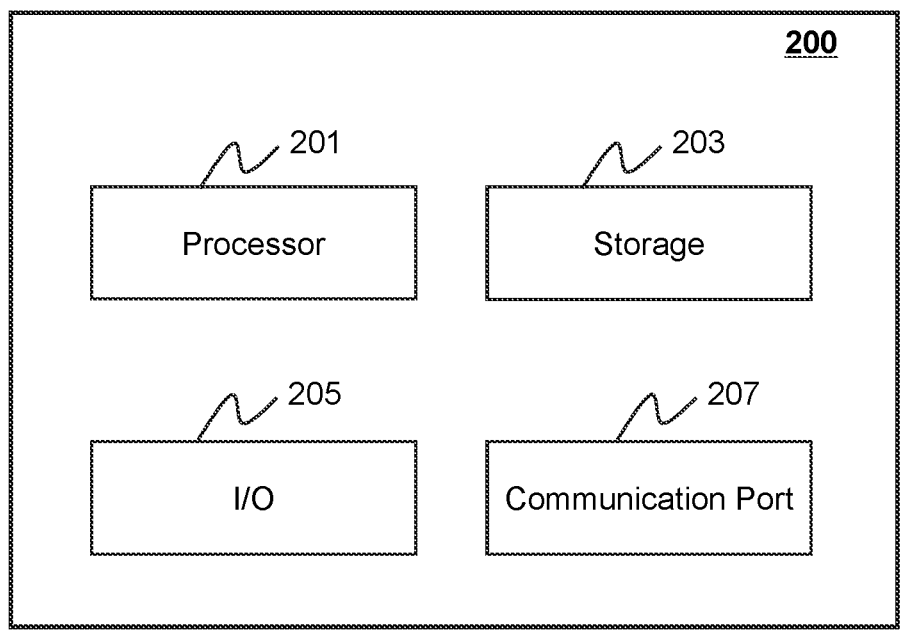
FIGS. 2A-2B are schematic diagrams illustrating exemplary hardware and software components of a computing device according to some embodiments of the present disclosure.

FIG. 2A is a schematic diagram illustrating exemplary hardware and/or software components of a computing device on which the image capture device 110 or the processing device 120 may be implemented according to some embodiments of the present disclosure. As illustrated in FIG. 2A, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 120 may be implemented on the computing device 200 and the processor 201 may perform video stabilization to the images and/or vides captured by the image capture device 110. In some embodiments, the processor 201 may include a microcontroller, a microprocessor, a reduced instruction preset computer (RISC), an application-specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for performing video stabilization to the images and/or videos captured by the image capture device 110. As another example, the storage 203 may store images and/or videos captured by the image capture device 110.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 2B:
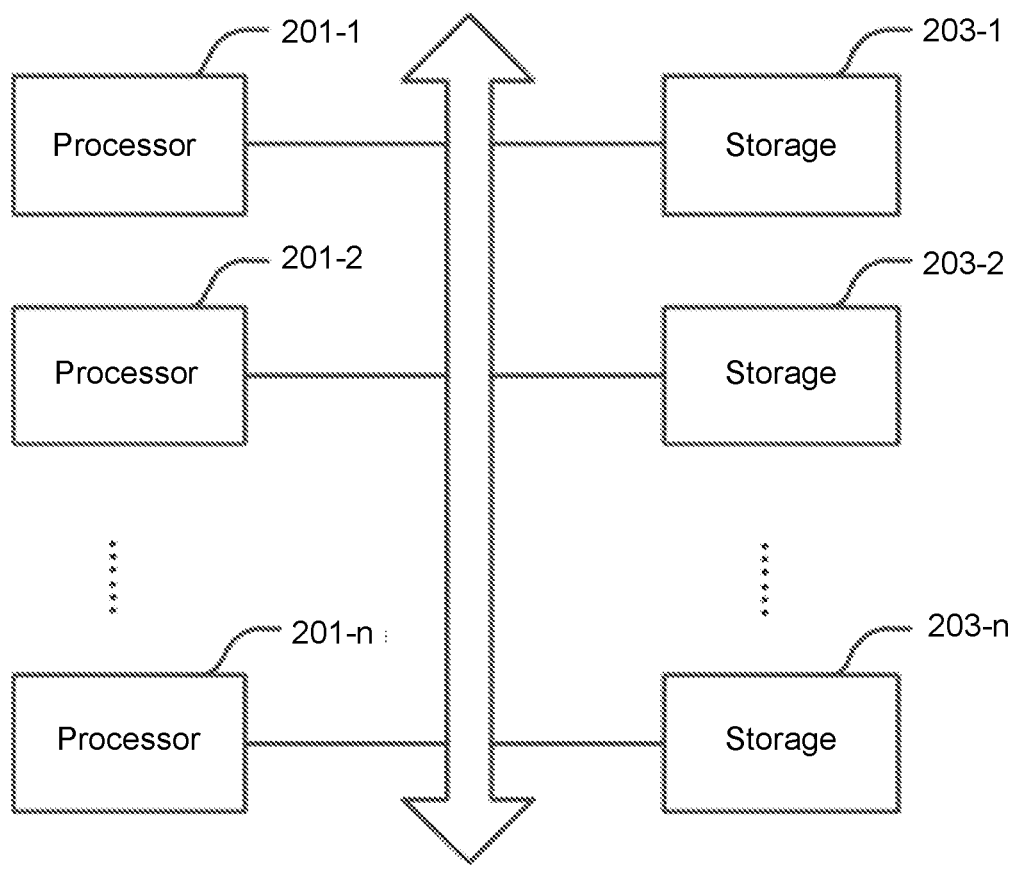

Merely for illustration purposes, only one processor is described in the computing device 200. However, it should be note that the computing device 200 in the present disclosure may also include multiple processors (e.g., processors 201-1, 201-2, . . . , 201-n shown in FIG. 2B), thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the processor 201-1 in FIG. 2B executes step A and the processor 201-2 in FIG. 2B executes step B, or the processors 201-1 and 201-2 jointly execute steps A and B).

Merely for illustration purposes, only one storage is described in the computing device 200. However, it should be note that the computing device 200 in the present disclosure may also include multiple storages (e.g., storages 203-1, 203-2, . . . , 203-n shown in FIG. 2B).

Figure 3:
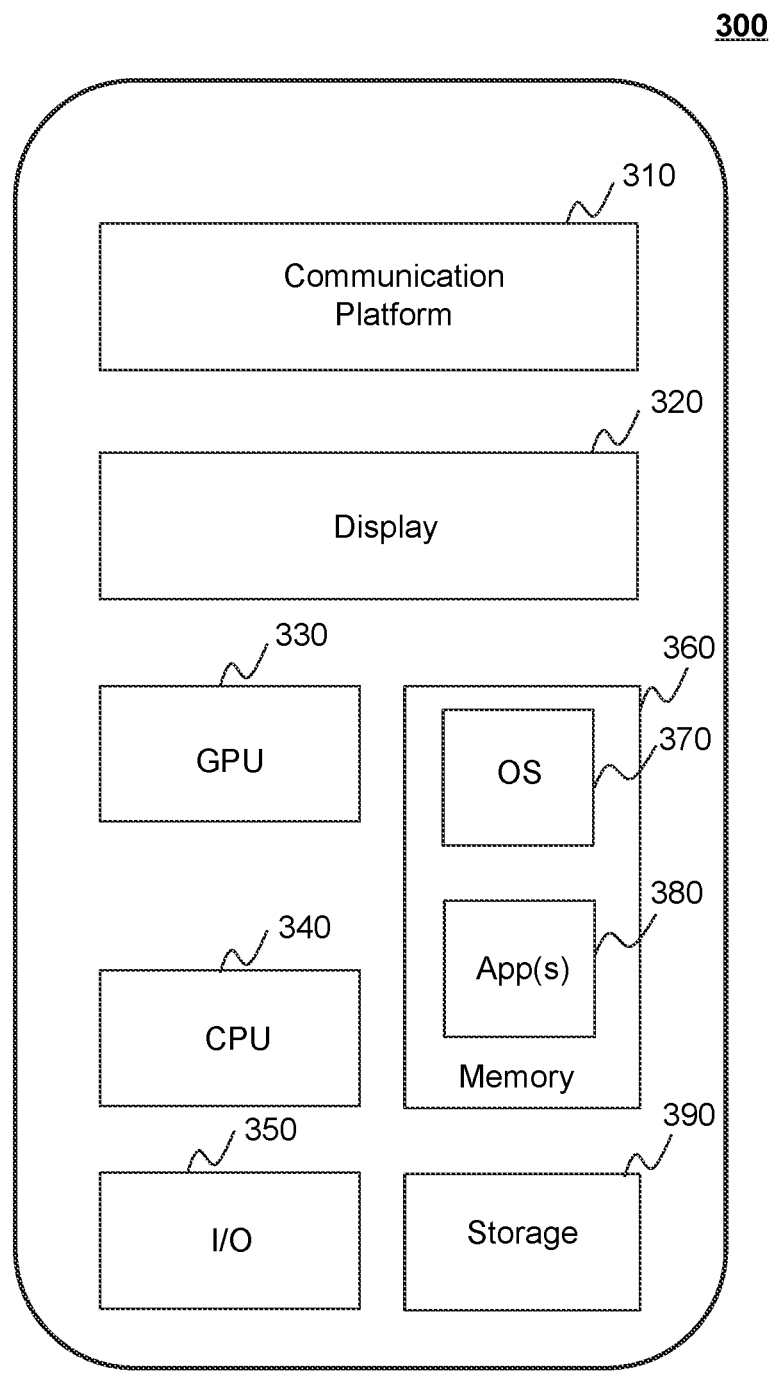
FIG. 3 is a schematic diagram illustrating exemplary hardware and software components of a mobile device according to some embodiments of the present disclosure.

FIG. 3 is a schematic diagram illustrating exemplary hardware and/or software components of a mobile device on which the image capture device 110 or the processing device 120 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 (e.g., a taxi-hailing application) may include a browser or any other suitable mobile apps for receiving and rendering information relating to transportation services or other information from the processing device 120. User interactions with the information stream may be achieved via the I/O 350 and provided to the processing device 120 and/or other components of the speed prediction system 100 via the network 130. Merely by way of example, a road feature transmit to a service requester may be displayed in the user terminal 140 through the display 320. As another example, a service provider may input an image related to a road segment through the I/O 350.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

At present, common camera exposure ways may include global shutter and rolling shutter.

In the global shutter, when the aperture of a camera (e.g., the image capture device 110) is opened, the entire sensor (e.g., an imaging chip) of the camera may be exposed at the same time. For example, in the global shutter, all pixels in a frame may be captured at the same time.

When a scene is imaged using the global shutter to generate a video, any two frames of the obtained consecutive frames of the video may be globally registered by affine transformation. The affine transformation may include translation, scaling, rotation, mirroring, or the like, or any combination thereof. At least a part of the two frames may completely overlap after the global registration.

The affine transformation may be performed by a homography matrix. Each affine transformation may correspond to a homography matrix. In computer vision, the homography (or the homography matrix) may be a transformation (e.g., a matrix) that maps one or more points in one plan (e.g., an image) to one or more corresponding points in another plan (e.g., another image).

In some embodiments, the homography matrix may be represented as Equation (1) below:

$$H_g = \begin{bmatrix} a & b & c \\ d & e & f \\ 0 & 0 & 1 \end{bmatrix}, \quad (1)$$

wherein $H_g$ represents to the homography matrix; a and e represents parameters related to horizontal and vertical scaling, respectively; b and d represents parameters related to tilt; and c and f represents parameters related to horizontal and vertical translation, respectively.

Figure 4A:
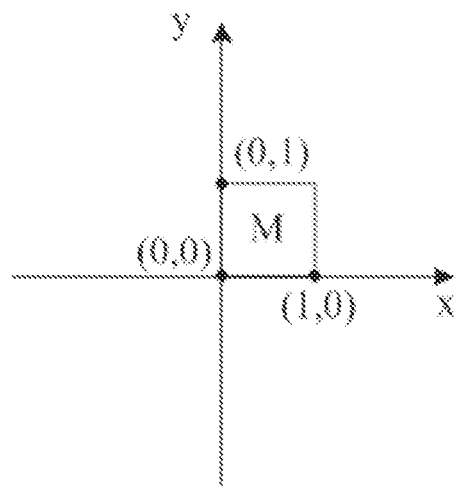
FIGS. 4A-4C are schematic diagrams illustrating various exemplary affine transformation according to some embodiments of the present disclosure.
Figure 4B:
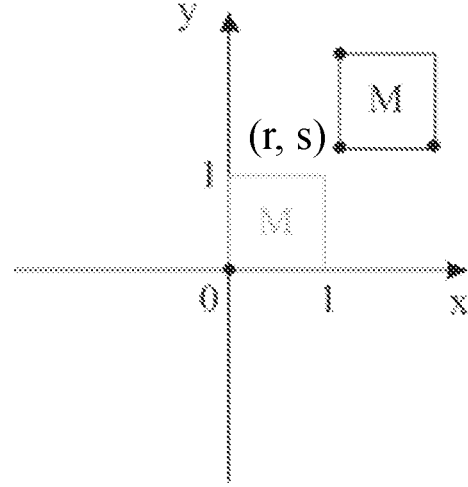
Figure 4C:
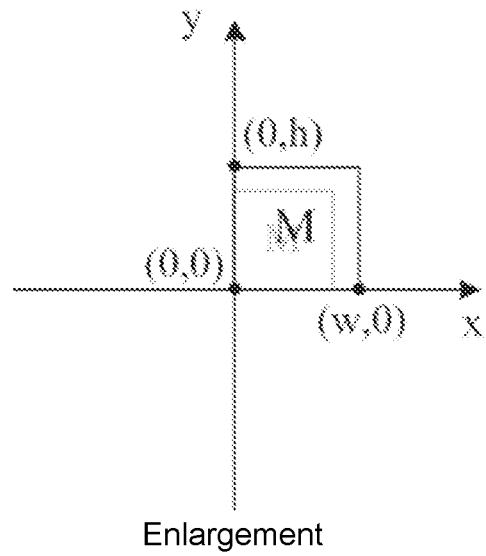

FIGS. 4A-4C are schematic diagrams illustrating various exemplary affine transformation according to some embodiments of the present disclosure.

Merely by way of example, the affine transformation 400-1, 400-2, and 400-3 shown in FIGS. 4A-4C may be performed to a square M. Before the affine transformation, the size of the square M is 1×1, and the lower-left corner of the square M is located at the origin (e.g., (0, 0)) of the coordinate system in FIGS. 4A-4C.

FIG. 4A illustrates an exemplary affine transformation 400-1 in which no change is performed to the square M. As shown in FIG. 4A, after the affine transformation 400-1, the size and the location of the square M are not changed. The homography matrix corresponding to the affine transformation 400-1 in FIG. 4A may be represented as $$H_{g1} = \begin{bmatrix} 1 & 0 & 0 \\ 0 & 1 & 0 \\ 0 & 0 & 1 \end{bmatrix}.$$

FIG. 4B illustrates an exemplary affine transformation 400-2 in which translation is performed to the square M. As shown in FIG. 4B, after the affine transformation 400-2, the size of the square M is not changed but the location of the square M is changed, for example, the lower-left corner of the square M is moved to (r, s). The homography matrix corresponding to the affine transformation 400-2 in FIG. 4B may be represented as $$H_{g2} = \begin{bmatrix} 1 & 0 & r \\ 0 & 1 & s \\ 0 & 0 & 1 \end{bmatrix}.$$

FIG. 4C illustrates an exemplary affine transformation 400-3 in which enlargement is performed to the square M. As shown in FIG. 4C, after the affine transformation 400-3, the location of the lower-left corner of the square M is not changed but the size of the square M is changed to w×h, for example, a length of the sides of the square M parallel to the x axis of the coordinate system is enlarged from 1 to w, and a length of the sides of the square M parallel to the y axis of the coordinate system is enlarged from 1 to h. The homography matrix corresponding to the affine transformation 400-3 in FIG. 4C may be represented as $$H_{g3} = \begin{bmatrix} w & 0 & 0 \\ 0 & h & 0 \\ 0 & 0 & 1 \end{bmatrix}.$$

The global registration may be performed through a single homography matrix. In this scenario, the homography matrix may also be called a global homography matrix.

Figure 5A:
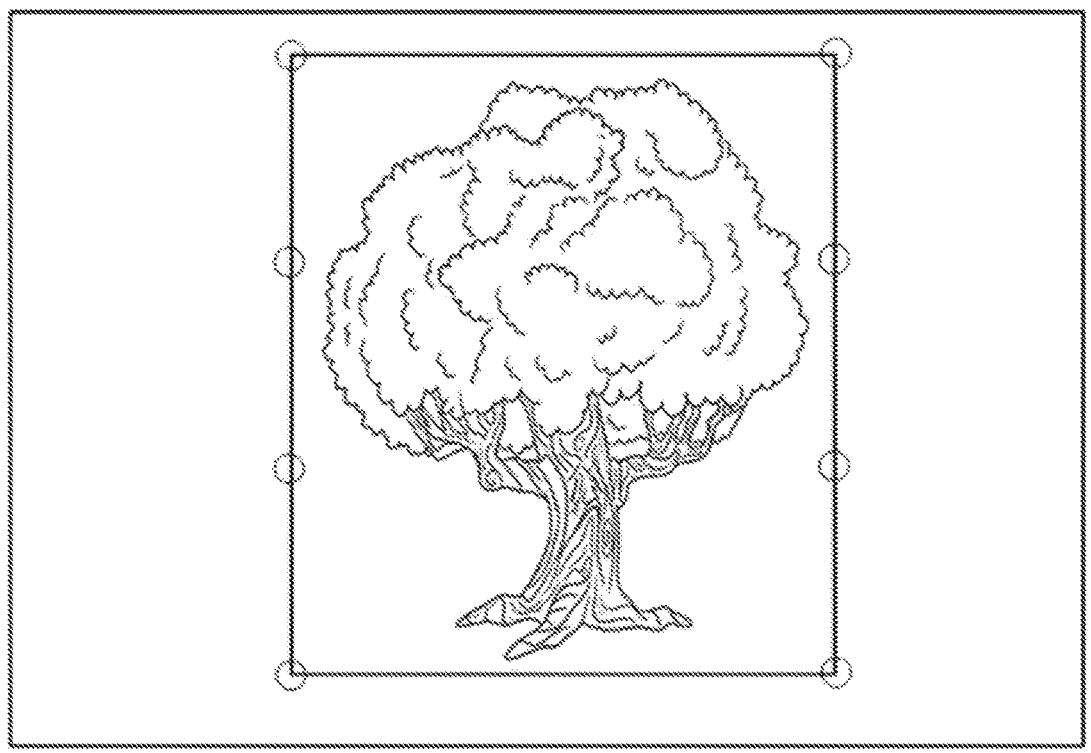
FIGS. 5A-5B are schematic diagrams illustrating two exemplary consecutive frames of a plurality of frames captured using global shutter according to some embodiments of the present disclosure.
Figure 5B:
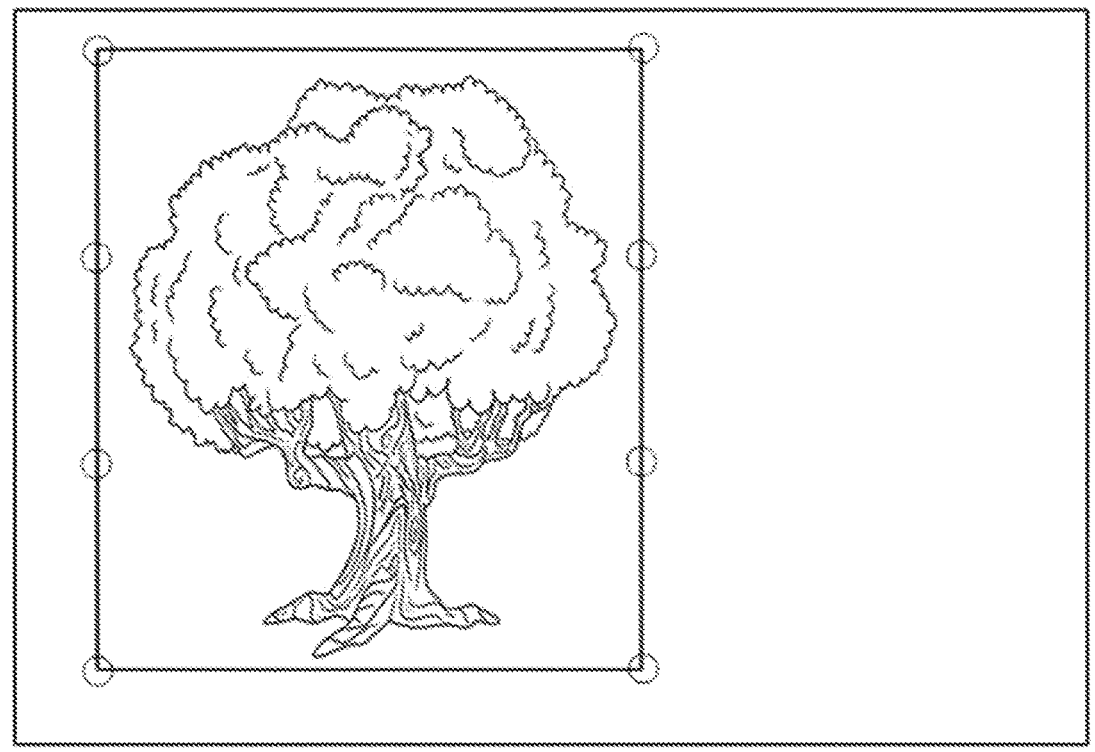

Merely by way of example, a tree is shot by a camera (e.g., the image capture device 110) using the global shutter and a video including a plurality of consecutive frames is obtained. FIG. 5A illustrates a certain frame 500-1 in the plurality of consecutive frames. FIG. 5B illustrates another frame 500-2 in the plurality of consecutive frames. Assume that the frame 500-2 is immediately following the frame 500-1.

Assume that the camera captures the plurality of consecutive frames of the tree at the same location and the location of the tree in the real world is fixed. Normally, the location of the tree in each of the plurality of consecutive frames may be the same. As shown in FIGS. 5A and 5B, the location of the tree in the frame 500-2 is not corresponding to the location of the tree in the frame 500-1. For example, in the frame 500-1, the tree is located at the center location. In the frame 500-2, the tree is not located at the center location. The global registration may be needed to be performed to the frame 500-2 relative to the frame 500-1 to make the location of the tree in the frame 500-2 correspond to the location of the tree in the frame 500-1.

The global registration process performed to the frame 500-2 may include the following operations.

In operation 1, K (K is a positive integer) feature points in the frame 500-2 may be determined by detecting the frame 500-2. In some embodiments, a feature point may refer to a pixel in a frame/image.

In operation 2, the coordinates of the K feature points may be tracked in the frame 500-1, and m (m is a positive integer) of the K feature points may be selected. The m feature points may have corresponding feature points in the frame 500-1.

In operation 3, a global homography matrix may be determined according to the coordinates of the m feature points in the frame 500-2 and the coordinates of the corresponding feature points in the frame 500-1.

For example, a feature point $P_0$ in the frame 500-2 may correspond to a feature point $P_1$ in the frame 500-1. $P_0$ and $P_1$ may correspond to the same feature of the same object. The global homography matrix may be determined according to Equation (1) and Equations (2)-(4) below:
and $$P_1 = H_g \times P_0, \quad (2)$$

$$P_0 = [x_0, y_0]^T, \quad (3)$$

$$P_1 = [x_1, y_1]^T, \quad (4)$$

wherein $x_0$ and $y_0$ refers to the coordinates of the feature point $P_0$ in the frame 500-2, and $x_1$ and $y_1$ refers to the coordinates of the feature point $P_1$ in the frame 500-1.

Equations (5)-(6) below may be obtained based on Equations (1)-(4):

$$x_1 = a \times x_0 + b \times y_0 + c \quad (5),$$

and $$y_1 = d \times x_0 + e \times y_0 + f \quad (6).$$

Therefore, if a feature point in the frame 500-2 and the corresponding feature point in the frame 500-1 are referred to as a feature point pair, the parameter values (e.g., parameters a-f in Equation (1)) of the global homography matrix used to correct the frame 500-2 relative to the frame 500-1 may be determined based on at least 3 feature point pairs.

In operation 4, the registration (or correction) may be performed to the frame 500-2 using the global homography matrix $H_g$.

It may be understood that the rolling shutter may be similar to the closing process of a shutter door. The rolling shutter is a way of image or video acquisition in which a frame is recorded not from a snapshot of a single point in time, but rather by scanning across the frame either vertically or horizontally. Thus, not all parts of the image may be recorded at the same time. This is in contrast with the global shutter in which the frame as a whole may be exposed for a given time window.

In some embodiments, the imaging direction of the rolling shutter may be in connection with row imaging along the column direction or column imaging along the row direction.

In the rolling shutter, when the aperture in the camera (e.g., the image capture device 110) is opened, there is also a roller blind that may operate for a period of time to control the exposure time of the sensor of the camera. The length of the exposure time may depend on the size of the opening of the roller blind and the speed of movement of the roller blind. The faster the roller blind moves, and the smaller the size of the opening of the roller blind is, the shorter the exposure time of the sensor may be.

The rolling shutter may be implemented by rolling (moving) a shutter of the camera across an exposable image area instead of exposing the image area as a whole at the same time. The shutter may be either mechanical or electronic. When an object (especially a moving object or the camera is moving) is shot using the rolling shutter, because pixels in frames/images of the object are captured at different times, the rolling shutter, however, may cause such effects as wobble, skew, smear, and partial exposure in the captured frames/images of the object. In this case, the frames/images may not be corrected by a single homography matrix.

Figure 6A:
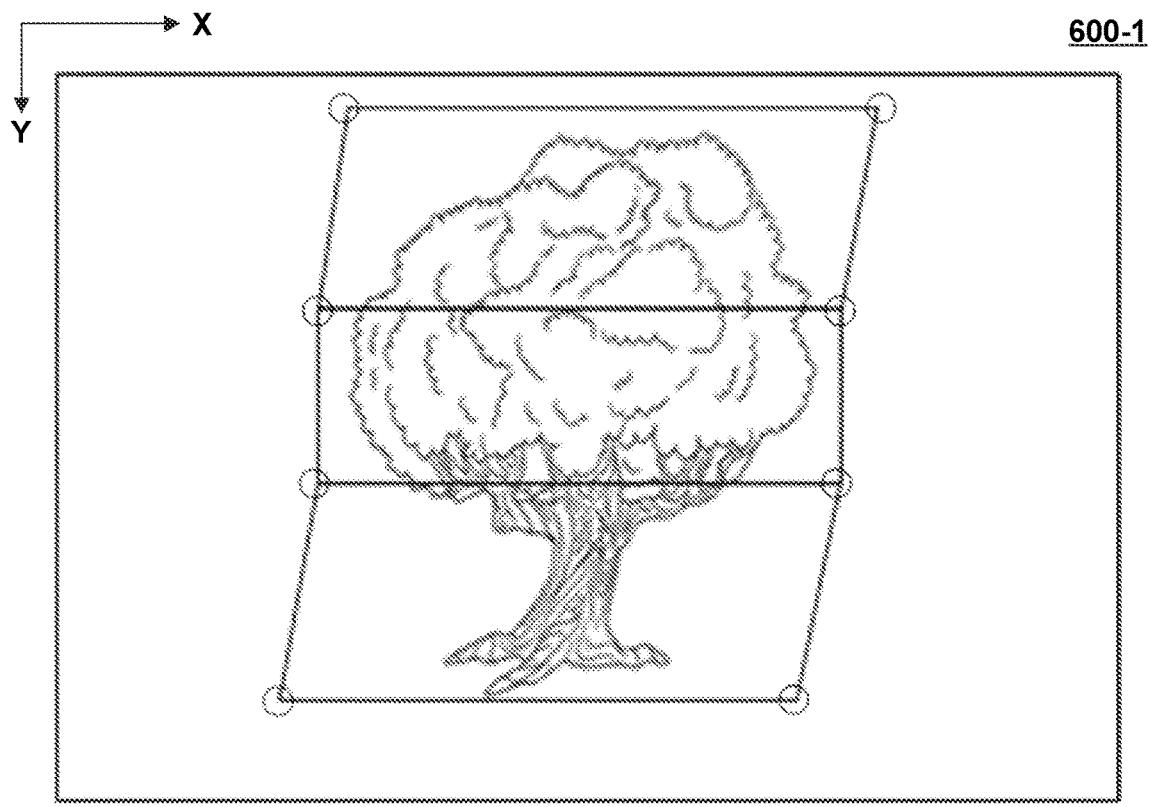
FIGS. 6A-6B are schematic diagrams illustrating two exemplary consecutive frames of a plurality of frames captured using rolling shutter according to some embodiments of the present disclosure.
Figure 6B:
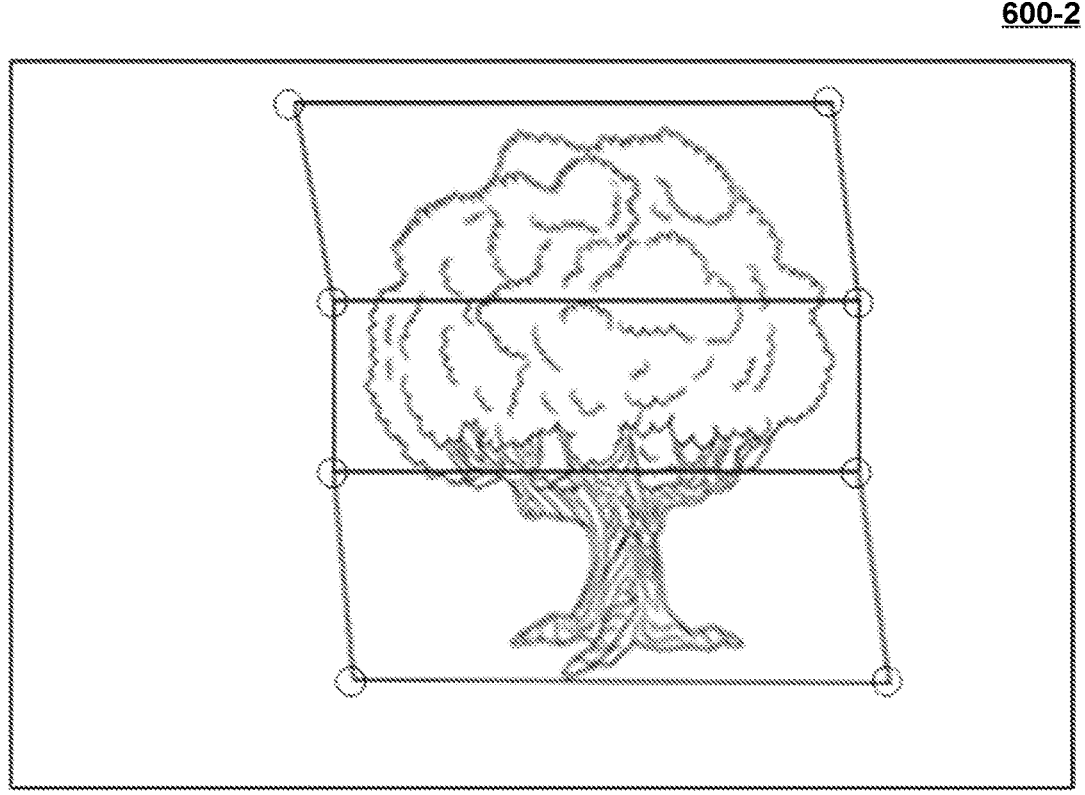

Merely by way of example, a tree is shot by a camera (e.g., the image capture device 110) using the rolling shutter and a video including a plurality of consecutive frames is obtained. FIG. 6A illustrates a certain frame 600-1 in the plurality of consecutive frames. FIG. 6B illustrates another frame 600-2 in the plurality of consecutive frames. Assume that the frame 600-2 is immediately following the frame 600-1.

As shown in FIGS. 6A and 6B, due to the characteristics of the rolling shutter, different magnitude of distortion may occur in different parts of the frames 600-1 and 600-2. The frame 600-1 or the frame 600-2 may not be corrected as a whole by a single homography matrix.

At present, the existing video stabilization algorithm may remove the rolling shutter effect while compensating for global motion. The existing video stabilization algorithm divides an image into M×N two-dimensional (2D) grids. Each of the 2D grids corresponds to a motion model that is represented by its four endpoints, and then a geometry-based loss function is created to ensure that the error of the feature point matching is minimized, and the deformation of the grid is also minimized. A motion parameter of each grid is obtained by solving the minimum value of the loss function. Finally, a new loss function is constructed by an optimization operation to ensure that the image is not deformed as much as possible and the motion path is as stable as possible, so that the correction or the removal of the rolling shutter effect is achieved. The grid-based algorithm brings in a lot of parameters and results in computational complexity, and also requires as dense feature points as possible, which imposes relatively large restrictions on the application scenarios.

In some embodiments of the present disclosure, methods and/or systems for video stabilization to remove the rolling shutter effect are provided. A target frame including a plurality of pixels arranged in rows and columns may be obtained. The target frame may be one of a plurality of consecutive frames of a video. The plurality of pixels of the target frame may be divided into a plurality of pixel groups based on an imaging direction of the target frame. The plurality of pixel groups may be divided into a plurality of sections. A plurality of feature points may be determined in the target frame. A global homography matrix related to the global motion of the target frame may be determined based on the coordinates of the feature points in the target frame and the coordinates of the corresponding feature points in other frames of the plurality of consecutive frames of the video. The other frames may be prior to the target frame. Because of the rolling shutter effect, if all pixels of the target frame are corrected by the global homography matrix, there may still be offsets between other feature points (e.g., different from the feature points used to determine the global homography matrix) in the target frame and the corresponding feature points in the other frames. For example, if the imaging direction of the target frame is in connection with a column direction of the target frame, each of the plurality of pixel groups may include a row of pixels of the plurality of pixels in the target frame. For a feature point in the target frame, the feature point may be processed by the global homography matrix. An offset of the processed feature point may refer to a displacement vector of the processed feature point relative to the corresponding feature point in a frame prior to the target frame. The offset may include an offset along the row direction of the target frame (also referred to as a row offset) and an offset along the column direction of the target frame (also referred to as a column offset). A curve function representing a relation between the coordinates and the offset of the feature point in the target frame may be determined. A correction matrix for each row of pixels may be determined based on the curve function. Each row of pixels may be corrected by the global homography matrix and the corresponding correction matrix to achieve the video stabilization to the target frame (e.g., the removal of the rolling shutter effect in the target frame).

FIGS. 7-14 are some embodiments of the methods and/or systems for video stabilization provided in the present disclosure to remove the rolling shutter effect in a video that is captured by the rolling shutter.

Figure 7:
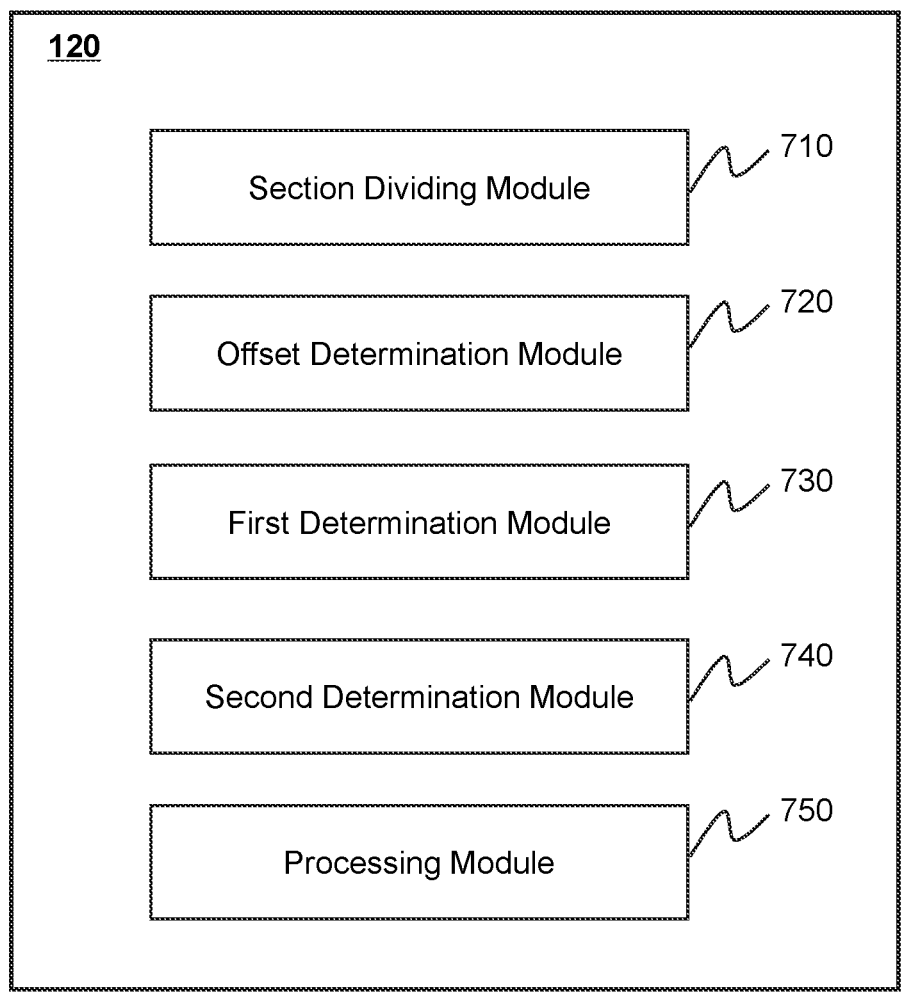
FIG. 7 is a schematic diagram illustrating an exemplary processing device according to some embodiments of the present disclosure.

FIG. 7 is a schematic diagram illustrating an exemplary processing device according to some embodiments of the present disclosure. The processing device 120 may include a section dividing module 710, an offset determination module 720, a first determination module 730, a second determination module 740, and a processing module 750.

The section dividing module 710 may obtain a target frame of a video. The target frame may include a plurality of pixels arranged in rows and columns. In some embodiments, the image capture device 110 may capture a scene and obtain a plurality of consecutive frames of a video. The target frame may be one of the plurality of consecutive frames of the video.

The section dividing module 710 may also divide the plurality of pixels into a plurality of pixel groups based on an imaging direction of the target frame. The rolling shutter is a way of image or video acquisition in which a frame is recorded not from a snapshot of a single point in time, but rather by scanning across the frame either vertically (e.g., scanning the frame from the top to the bottom or from the bottom to the top of the frame) or horizontally (e.g., scanning the frame from the right to the left or from the left to the right of the frame).

For example, if the image capture device 110 records the target frame by scanning across the target frame vertically, the imaging direction of the target frame may be a column direction of the target frame. For example, if the frame 600-1 in FIG. 6A is the target frame, the column direction of the target frame may be parallel to the Y direction in FIG. 6A. In this case, each of the plurality of pixel groups may include a row of pixels in the target frame.

As another example, if the image capture device 110 records the target frame by scanning across the target frame horizontally, the imaging direction of the target frame may be a row direction of the target frame. For example, if the frame 600-1 in FIG. 6A is the target frame, the row direction of the target frame may be parallel to the X direction in FIG. 6A. In this case, each of the plurality of pixel groups may include a column of pixels in the target frame.

The section dividing module 710 may also divide the plurality of pixel groups into a plurality of sections. Each of the plurality of sections may correspond to a boundary line. The boundary line may be one of the plurality of pixel groups.

In some embodiments, the way of dividing the plurality of pixel groups into the plurality of sections may include random dividing, dividing based on a preset rule, or the like.

Merely by way of example, the section dividing module 710 may divide the plurality of pixel groups in the target frame into a plurality of blocks. The processing device 120 may determine a plurality of boundary lines based on the plurality of blocks. The processing device 120 may determine the plurality of sections based on the plurality of boundary lines.

The offset determination module 720 may determine a plurality of first feature points in the target frame. In some embodiments, the first feature point may be a pixel in the target frame. In some embodiments, the plurality of first feature points may be at least a part of the plurality of pixels in the target frame. For example, a ratio of a count of the plurality of first feature points to a count of all pixels in the target frame may be greater than or equal to a pixel threshold, such as 50%, 60%, 70%, 80%, 90%, 100%, etc.

The offset determination module 720 may also determine first location information of the plurality of first feature points in the target frame. In some embodiments, the first location information of the plurality of first feature points in the target frame may be the coordinates (e.g., including the x coordinates and the y coordinates) of the plurality of first feature points in the target frame.

The offset determination module 720 may also determine second location information of the plurality of first feature points in a frame prior to the target frame (also referred to as a previous frame) in the video. In some embodiments, the offset determination module 720 may identify feature points in the previous frame corresponding to the plurality of first feature points and determine the coordinates (e.g., including x coordinates and the y coordinates) of the corresponding feature points in the previous frame. The coordinates of the corresponding feature points in the previous frame may be the second location information of the plurality of first feature points in the previous frame. In some embodiments, the first feature point in the target frame and its corresponding feature point in the previous frame may correspond to the same feature of the same object in the captured scene.

The offset determination module 720 may also obtain a global homography matrix.

In some embodiments, the processing device 120 may obtain the global homography matrix $H_g$ by performing operations similar to operations 1-3 described above.

For example, a plurality of second feature points in the target frame may be determined by detecting the target frame. In some embodiments, at least one of the plurality of second feature points may be included in the plurality of first feature points, or the plurality of first feature points may be different from the plurality of second feature points. The coordinates of the second feature points may be tracked in the previous frame, and one or more of the plurality of second feature points may be selected. The selected feature points may have corresponding feature points in the previous frame. In some embodiments, the one or more of the plurality of second feature points may be randomly selected from the plurality of second feature points. In some embodiments, the one or more selected feature points may be determined in a certain region (e.g., a block described in operation 1110 of the process 1100 in FIG. 11) in the target frame based on the imaging direction of the target frame. The global homography matrix $H_g$ may be determined according to the coordinates of the one or more selected feature points in the target frame and the coordinates of the corresponding feature points in the previous frame.

The offset determination module 720 may also determine an offset of each of the plurality of first feature points based on the first location information and the second location information of the first feature point, and the global homography matrix.

In some embodiments, the offset determination module 720 may perform the affine transformation to the plurality of first feature points using the global homography matrix $H_g$. The offset of each of the plurality of first feature points may refer to the offset between the transformed coordinates of the first feature point in the target frame and the coordinates of the corresponding feature point in the previous frame.

In some embodiments, the transformed coordinates of the plurality of first feature points in the target frame based on the global homography matrix $H_g$ may be referred to as third location information of the plurality of first feature points. The first location information of the plurality of first feature points may include the coordinates of the plurality of first feature points in the target frame without the affine transformation.

Taking the frame 600-1 in FIG. 6A and the frame 600-2 in FIG. 6B as an example, the frame 600-2 may be the target frame and the frame 600-1 may be the previous frame. Because of the characteristics of the rolling shutter, if the frame 600-2 is corrected using a global homography matrix that is obtained based on the plurality of second feature points, there may still be offsets between the coordinates of other pixels (e.g., different from the second feature points) in the corrected target frame and the coordinates of the corresponding pixels in the previous frame. The offset may be a vector and may include an offset along the row direction or the X direction of the target frame (also referred to as a row offset or an X-direction offset) and an offset along the column direction or the Y direction of the target frame (also referred to as a column offset or a Y-direction offset).

In some embodiments, the offset of the first feature point may be the offset between the second location information and the third location information of the first feature point. For example, the row offset of the first feature point may be a difference between the transformed x coordinate of the first feature point based on $H_g$ and the x coordinate of the corresponding feature point in the previous frame. The column offset of the first feature point may be a difference between the transformed y coordinate of the first feature point based on $H_g$ and the y coordinate of the corresponding feature point in the previous frame.

The first determination module 730 may determine a fitting result by performing curve fitting based on the first location information and the offsets of the plurality of first feature points.

For brevity, the description of the curve fitting may take the imaging direction that is the column direction as an example. If the imaging direction is the row direction, the curve fitting may be similar to the description of the curve fitting in which the imaging direction is the column direction.

The first determination module 730 may perform curve fitting to determine a first curve indicating a relation between the y coordinates of the first location information and the row offsets of the first feature points, and a second curve indicating a relation between the y coordinates of the first location information and the column offsets of the first feature points. The fitting result may include the first curve and the second curve.

For each of the plurality of pixel groups, the first determination module 730 may also determine a correction matrix based on the fitting result.

The first determination module 730 may determine, for each of the boundary lines, a first correction matrix based on the fitting result.

In some embodiments, for each of the boundary lines, the first determination module 730 may determine a first set of linear parameters by putting the y coordinate of the first location information of the boundary line into a first derivative of the first polynomial curve function. The first determination module 730 may determine a second set of linear parameters by putting the y coordinate of the first location information of the boundary line into a first derivative of the second polynomial curve function. The first determination module 730 may determine the first correction matrix of the boundary line based on the first set of linear parameters and the second set of linear parameters.

For each of the plurality of pixel groups excluding the boundary lines (also referred to as the remained pixel groups), the first determination module 730 may determine a second correction matrix based on the first correction matrix of the boundary line adjacent to the remained pixel group.

In some embodiments, the first determination module 730 may determine the second correction matrix of the remained pixel based on the first correction matrix of the boundary line adjacent to the remained pixel group using linear interpolation.

Merely by way of example, the first determination module 730 may determine the second correction matrix of the remained pixel group by determining a weighted average of the first correction matrix of the boundary line adjacent to the remained pixel group.

In some embodiments, a weight for the first correction matrix of the boundary line adjacent to the remained pixel group may be determined based on the distance between the boundary line adjacent to the remained pixel group and the remained pixel group. Further, the weight for the first correction matrix of the boundary line adjacent to the remained pixel group may be determined based on a ratio of the distance between the remained pixel group and the boundary line adjacent to the remained pixel group to a count of pixel groups in the section including the remained pixel group. The shorter the distance is, the more relevant the second correction matrix of the remained pixel group may be to the first correction matrix of the boundary line adjacent to the remained pixel group, and the greater the weight of the first correction matrix of the boundary line adjacent to the remained pixel group may be.

The processing module 750 may process the pixels in the pixel group based on the global homography matrix and the correction matrix.

For each of the plurality of pixel groups, the second determination module 740) may determine a correction homography matrix based on the global homography matrix and the correction matrix.

The processing module 750 may also process the pixels in the pixel group based on the correction homography matrix.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the first determination module 730 and the second determination module 740 may be combined into a single module which may determine the fitting result, determine the correction matrix, and determine the correction homography matrix. As another example, the first determination module 730 may be divided into two units. A first unit may determine the fitting result. A second unit may determine the correction matrix.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may further include a storage module (not shown in FIG. 7). The storage module may be configured to store data generated during any process performed by any component of in the processing device 120. As another example, each of components of the processing device 120 may correspond to a storage module, respectively. Additionally or alternatively, the components of the processing device 120 may share a common storage module. As still another example, the second determination module 740 may be omitted.

Figure 8:
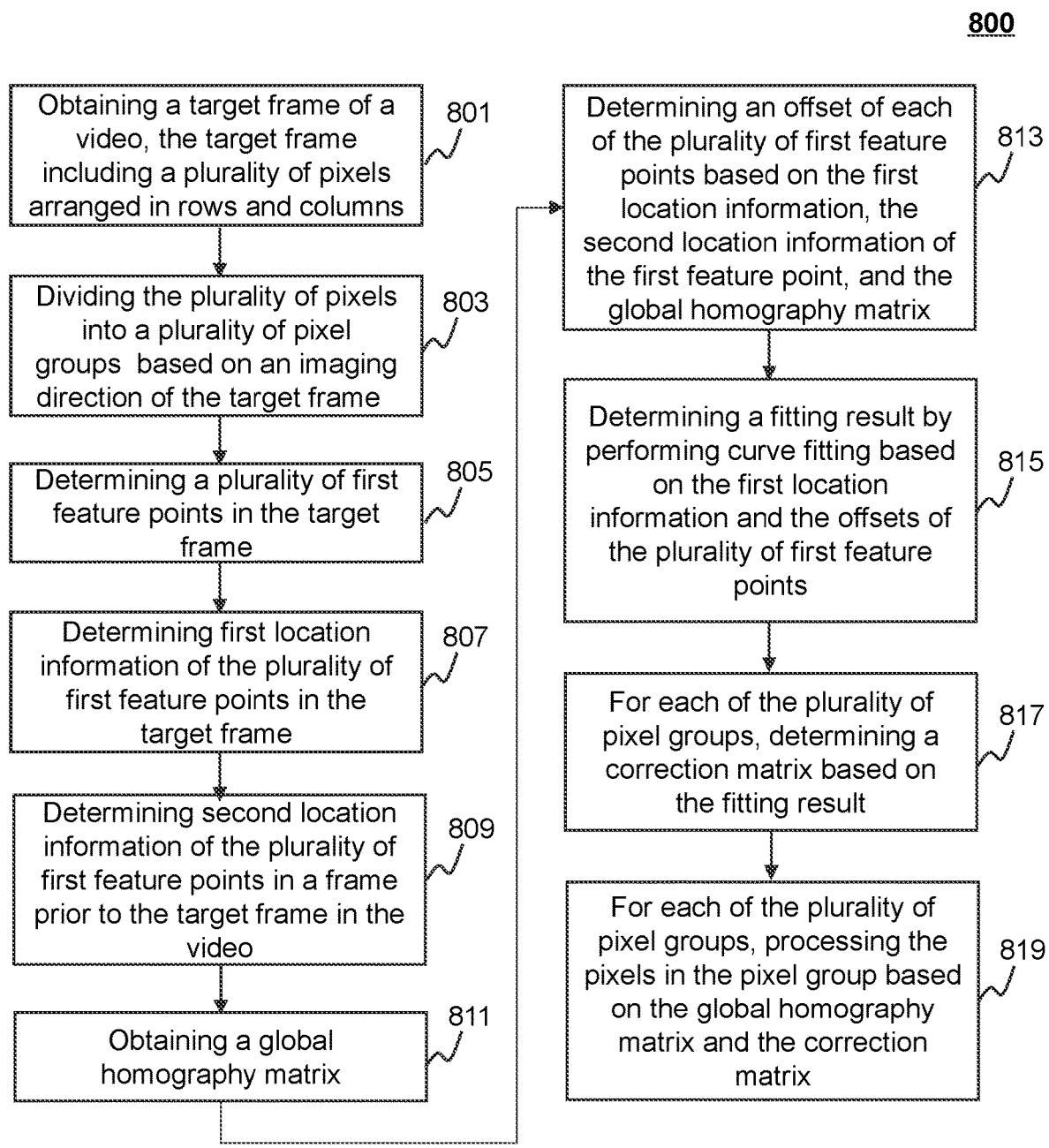
FIG. 8 is a flowchart illustrating an exemplary process for video stabilization according to some embodiments of the present disclosure.

FIG. 8 is a flowchart illustrating an exemplary process for video stabilization according to some embodiments of the present disclosure. In some embodiments, the process 800 may be implemented in the imaging system 100 illustrated in FIG. 1. For example, the process 800 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 7). The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 801, the processing device 120 (e.g., the section dividing module 710) may obtain a target frame of a video. The target frame may include a plurality of pixels arranged in rows and columns. In some embodiments, the image capture device 110 may capture a scene and obtain a plurality of consecutive frames of a video. The target frame may be one of the plurality of consecutive frames of the video.

In some embodiments, the process 800 may be used to perform video stabilization in real time. In this case, the target frame may be the current frame of the video. For example, the image capture device 110 is working to shot a scene to capture a plurality of consecutive frames to form a video. The current frame may be the newest captured frame by the image capture device 110 in real time. In some embodiments, the process 800 may be used to perform video stabilization to a video that has been completed. In this case, the target frame may be any one frame in the video.

In 803, the processing device 120 (e.g., the section dividing module 710) may divide the plurality of pixels into a plurality of pixel groups based on an imaging direction of the target frame. The rolling shutter is a way of image or video acquisition in which a frame is recorded not from a snapshot of a single point in time, but rather by scanning across the frame either vertically (e.g., scanning the frame from the top to the bottom or from the bottom to the top of the frame) or horizontally (e.g., scanning the frame from the right to the left or from the left to the right of the frame).

For example, if the image capture device 110 records the target frame by scanning across the target frame vertically, the imaging direction of the target frame may be a column direction of the target frame. For example, if the frame 600-1 in FIG. 6A is the target frame, the column direction of the target frame may be parallel to the Y direction in FIG. 6A. In this case, each of the plurality of pixel groups may include a row of pixels in the target frame.

As another example, if the image capture device 110 records the target frame by scanning across the target frame horizontally, the imaging direction of the target frame may be a row direction of the target frame. For example, if the frame 600-1 in FIG. 6A is the target frame, the row direction of the target frame may be parallel to the X direction in FIG. 6A. In this case, each of the plurality of pixel groups may include a column of pixels in the target frame.

In 805, the processing device 120 (e.g., the offset determination module 720) may determine a plurality of first feature points in the target frame. In some embodiments, the first feature point may be a pixel in the target frame. In some embodiments, the plurality of first feature points may be at least a part of the plurality of pixels in the target frame. For example, a ratio of a count of the plurality of first feature points to a count of all pixels in the target frame may be greater than or equal to a pixel threshold, such as 50%, 60%, 70%, 80%, 90%, 100%, etc.

In 807, the processing device 120 (e.g., the offset determination module 720) may determine first location information of the plurality of first feature points in the target frame. In some embodiments, the first location information of the plurality of first feature points in the target frame may be the coordinates (e.g., including the x coordinates and the y coordinates) of the plurality of first feature points in the target frame.

In 809, the processing device 120 (e.g., the offset determination module 720) may determine second location information of the plurality of first feature points in a frame prior to the target frame (also referred to as a previous frame) in the video. In some embodiments, the processing device 120 may identify feature points in the previous frame corresponding to the plurality of first feature points and determine the coordinates (e.g., including x coordinates and the y coordinates) of the corresponding feature points in the previous frame. The coordinates of the corresponding feature points in the previous frame may be the second location information of the plurality of first feature points in the previous frame. In some embodiments, the first feature point in the target frame and its corresponding feature point in the previous frame may correspond to the same feature of the same object in the captured scene.

In some embodiments, the x coordinate (also referred to as the column coordinate) in the target frame (or the previous frame) may refer to the coordinate along the row direction or the X direction of the target frame (or the previous frame). The y coordinate (also referred to as the row coordinate) in the target frame (or the previous frame) may refer to the coordinate along the column direction or the Y direction of the target frame (or the previous frame).

In 811, the processing device 120 (e.g., the offset determination module 720) may obtain a global homography matrix.

In some embodiments, the processing device 120 may obtain the global homography matrix $H_g$ by performing operations similar to operations 1-3 described above.

For example, a plurality of second feature points in the target frame may be determined by detecting the target frame. In some embodiments, at least one of the plurality of second feature points may be included in the plurality of first feature points, or the plurality of first feature points may be different from the plurality of second feature points. The coordinates of the second feature points may be tracked in the previous frame, and one or more of the plurality of second feature points may be selected. The selected feature points may have corresponding feature points in the previous frame. In some embodiments, the one or more of the plurality of second feature points may be randomly selected from the plurality of second feature points. In some embodiments, the one or more selected feature points may be determined in a certain region (e.g., a block described in operation 1110 of the process 1100 in FIG. 11) in the target frame based on the imaging direction of the target frame. The global homography matrix $H_g$ may be determined according to the coordinates of the one or more selected feature points in the target frame and the coordinates of the corresponding feature points in the previous frame.

In 813, the processing device 120 (e.g., the offset determination module 720) may determine an offset of each of the plurality of first feature points based on the first location information and the second location information of the first feature point, and the global homography matrix.

In some embodiments, the processing device 120 may perform the affine transformation to the plurality of first feature points using the global homography matrix $H_g$. The offset of each of the plurality of first feature points may refer to the offset between the transformed coordinates of the first feature point in the target frame and the coordinates of the corresponding feature point in the previous frame.

In some embodiments, the transformed coordinates of the plurality of first feature points in the target frame based on the global homography matrix $H_g$ may be referred to as third location information of the plurality of first feature points. The first location information of the plurality of first feature points may include the coordinates of the plurality of first feature points in the target frame without the affine transformation.

Taking the frame 600-1 in FIG. 6A and the frame 600-2 in FIG. 6B as an example, the frame 600-2 may be the target frame and the frame 600-1 may be the previous frame. Because of the characteristics of the rolling shutter, if the frame 600-2 is corrected using a global homography matrix that is obtained based on the plurality of second feature points, there may still be offsets between the coordinates of other pixels (e.g., different from the second feature points) in the corrected target frame and the coordinates of the corresponding pixels in the previous frame. The offset may be a vector and may include an offset along the row direction or the X direction of the target frame (also referred to as a row offset or an X-direction offset) and an offset along the column direction or the Y direction of the target frame (also referred to as a column offset or a Y-direction offset).

In some embodiments, the offset of the first feature point may be the offset between the second location information and the third location information of the first feature point. For example, the row offset of the first feature point may be a difference between the transformed x coordinate of the first feature point based on $H_g$ and the x coordinate of the corresponding feature point in the previous frame. The column offset of the first feature point may be a difference between the transformed y coordinate of the first feature point based on $H_g$ and the y coordinate of the corresponding feature point in the previous frame.

For example, a feature point $P_2$ in the target frame (e.g., the frame 600-2) may correspond to a feature point $P_3$ in the previous frame (e.g., the frame 600-1). $P_2$ and $P_3$ may correspond to the same feature of the same object. For example, $P_2$ may be one of the plurality of first feature points. The relation between $P_2$ and $P_3$ may be represented as Equation (7) below:

$$P_3 = H_g \times P_2 + [Vx Vy 0]^T \quad (7),$$

wherein Vx refers to the row offset between the transformed x coordinate of $P_2$ based on the global homography matrix $H_g$ and the x coordinate of $P_3$ in the previous frame; and Vy refers to the column offset between the transformed y coordinate of $P_2$ based on the global homography matrix $H_g$ and the y coordinate of $P_3$ in the previous frame.

The processing device 120 may determine the offset between $P_2$ and $P_3$ based on Equation (8) that is obtained by transforming Equation (7) and Equations (9)-(10) below: and $$\begin{bmatrix} Vx \\ Vy \\ 0 \end{bmatrix} = P_3 - H_g \cdot P_2, \quad (8)$$

$$P_2 = [x_2, y_2, 1]^T, \quad (9)$$

$$P_3 = [x_3, y_3, 1]^T, \quad (10)$$

wherein $x_2$ and $y_2$ refers to the coordinates of the feature point $P_2$ in the target frame before the affine transformation using $H_g$ (e.g., the first location information of $P_2$), and $x_3$ and $y_3$ refers to the coordinates of the feature point $P_3$ in the previous frame (e.g., the second location information of $P_2$).

In some embodiments, the processing device 120 may determine the offset of each of the plurality of first feature points based on Equations (8)-(10).

It should be noted that the above description for determining the offset is merely provided for the purposes of illustration, and not intended to limit the scope of the present disclosure. For persons having ordinary skills in the art, multiple variations and modifications (e.g., mathematical transformation) may be made under the teachings of the present disclosure. However, those variations and modifications do not depart from the scope of the present disclosure. For example, the processing device 120 may perform the affine transformation to the previous frame using the global homography matrix. The processing device 120 may determine the offset between the coordinates of the each of the plurality of first feature points in the target frame and the transformed coordinates of the corresponding feature point in the previous frame.

In 815, the processing device 120 (e.g., the first determination module 730) may determine a fitting result by performing curve fitting based on the first location information and the offsets of the plurality of first feature points.

For brevity, the description of the curve fitting may take the imaging direction that is the column direction as an example. If the imaging direction is the row direction, the curve fitting may be similar to the description of the curve fitting in which the imaging direction is the column direction.

For each of the plurality of first feature points, the processing device 120 may obtain a four-dimensional vector $[x\ y\ Vx\ Vy]^T$ corresponding to the first feature point. Because the target frame is captured using the rolling shutter and the imaging direction of the target frame is the column direction, the pixels in each row of the target frame are captured at the same time and the pixels in each column of the target frame are captured at different times. Therefore, compared to the x coordinate of the first feature point in the target frame, the y coordinate of the first feature point in the target frame may be more relevant to the offset of the first feature point.

The processing device 120 may perform curve fitting to determine a first curve indicating a relation between the y coordinates of the first location information and the row offsets of the first feature points, and a second curve indicating a relation between the y coordinates of the first location information and the column offsets of the first feature points. The fitting result may include the first curve and the second curve.

Figure 9A:
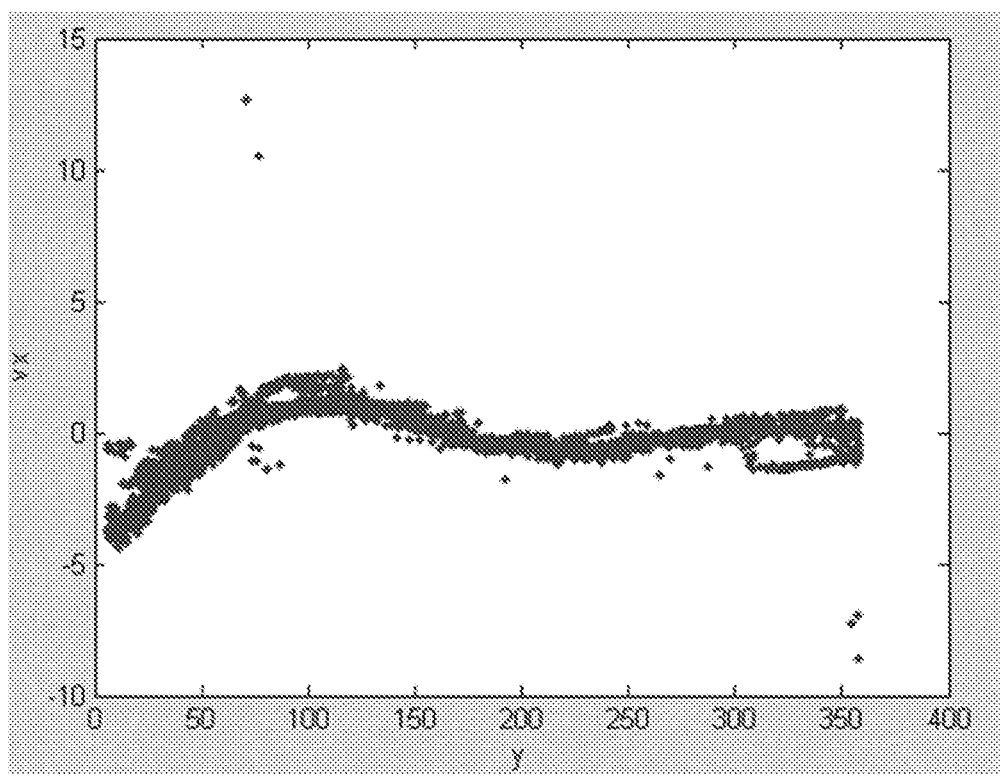
FIG. 9A is a schematic diagram illustrating an example of a plurality of first discrete points each of which indicates a y coordinate of one of the plurality of first feature points and a row offset of the first feature point according to some embodiments in the present disclosure.
Figure 9B:
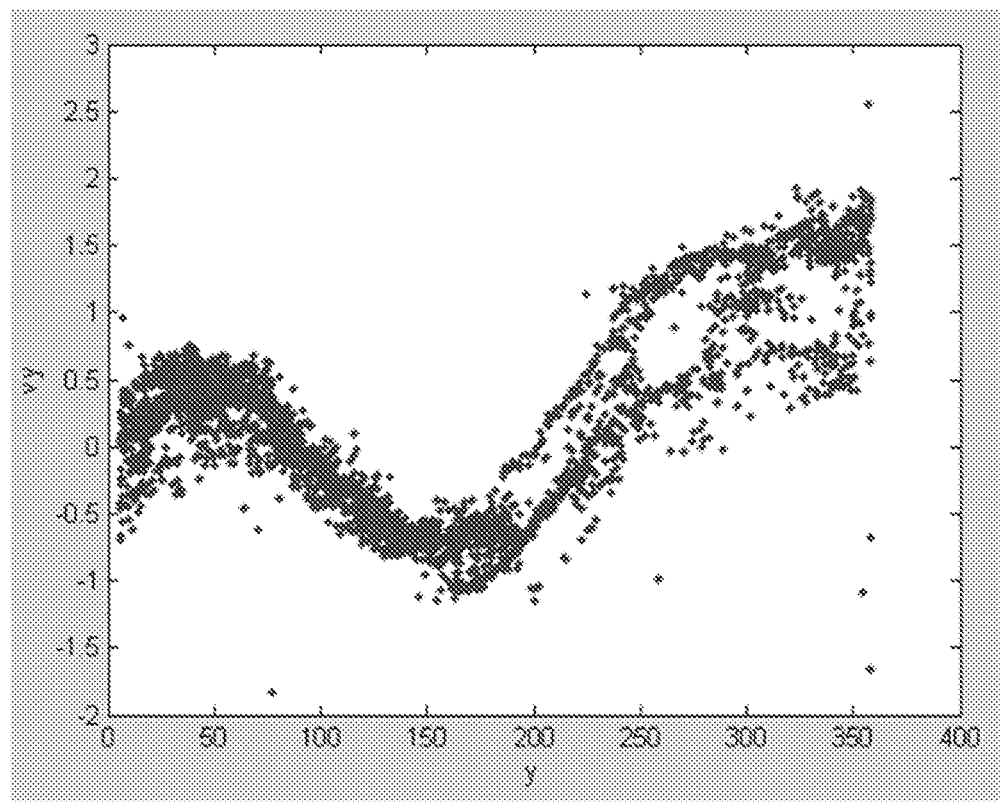
FIG. 9B is a schematic diagram illustrating an example of a plurality of second discrete points each of which indicates a y coordinate of one of the plurality of first feature points and a column offset of the first feature point according to some embodiments in the present disclosure.

Merely by way of example, FIG. 9A is a schematic diagram illustrating an example of a plurality of first discrete points each of which indicates the y coordinate of the first location information and the row offset of one of the plurality of first feature points according to some embodiments in the present disclosure. In FIG. 9A, the horizontal axis indicates the y coordinates of the first location information of the plurality of first feature points and the vertical axis indicates the row offsets of the plurality of first feature points. FIG. 9B is a schematic diagram illustrating an example of a plurality of second discrete points each of which indicates the y coordinate of the first location information and the column offset of one of the plurality of first feature points according to some embodiments in the present disclosure. In FIG. 9B, the horizontal axis indicates the y coordinates of the first location information of the plurality of first feature points and the vertical axis indicates the column offsets of the plurality of first feature points.

The processing device 120 may determine the first curve based on the plurality of first discrete points, and determine the second curve based on the plurality of second discrete points.

In some embodiments, the process for the curve fitting may include polynomial curve fitting, spline curve fitting, or the like, or any combination thereof.

Taking the curve fitting using a quantic polynomial as an example, the processing device 120 may determine the first curve by performing the curve fitting based on the y coordinates of the first location information and the row offsets of the plurality of first feature points (e.g., the plurality of first discrete points in FIG. 9A) using Equation (11) below:

$$Vx(y) = a_4 \times y^4 + a_3 \times y^3 + a_2 \times y^2 + a_1 \times y + a_0 \qquad (11),$$

wherein Vx(y) refers to a first polynomial curve function corresponding to the first curve; and $a_0$-$a_4$ refer to parameters of the first polynomial curve function.

Equation (11) may also be represented as Equation (12) below:

$$Vx(y) = A \times Y \qquad (12),$$

wherein $A = [a_4 \ a_3 \ a_2 \ a_1 \ a_0]$; and $Y = [y^4 \ y^3 \ y^2 \ y^1 \ y^0]$ The processing device 120 may determine the second curve by performing the curve fitting based on the y coordinates of the first location information and the column offsets of the plurality of first feature points (e.g., the plurality of second discrete points in FIG. 9B) using Equation (13) below:

$$Vy(y) = b_4 \times y^4 + b_3 \times y^3 + b_2 \times y^2 + b_1 \times y + b_0 \qquad (13),$$

wherein Vy(y) refers to a second polynomial curve function corresponding to the second curve; and $b_0$-$b_4$ refer to parameters of the second polynomial curve function.

Equation (13) may also be represented as Equation (14) below:

$$Vy(y) = B \times Y \qquad (14),$$

wherein $B = [b_4 \ b_3 \ b_2 \ b_1 \ b_0]$; and $Y = [y^4 \ y^3 \ y^2 \ y^1 \ y^0]$ The processing device 120 may solve Equation (11) and Equation (13) based on a fitting cost function. For example, the fitting cost function may relate to a least square error and may be represented as Equation (15) below:

$$Z = \Sigma_i ((Vx_i - AY_i)^2 + (Vy_i - BY_i)^2) \qquad (15),$$

wherein Z refers to the fitting cost function; $Vx_i$ refers to the row offset of a feature point i of the plurality of first feature points; $Vy_i$ refers to the column offset of the feature point i; $Y_i = [y_i^4, y_i^3, y_i^2, y_i^1, y_i^0]$, and $y_i$ refers to the y coordinate of the first location information of the feature point i in the target frame.

In some embodiments, because the interval between the capture times of two adjacent rows of pixels in the target frame is relatively short, the variation of the row offsets in the first curve and the variation of the column offsets in the second curve may be relatively small. A regularization item may be added to Equation (15) to impose a constraint condition on the variation of the row offsets in the first curve and/or the variation of the column offsets in the second curve. For example, the fitting cost function including the regularization item may be represented as Equation (16) below:

$$Z' = \sum_i ((Vx_i - AY_i)^2 + (Vy_i - BY_i)^2) + \qquad (16)$$
$$\lambda \sum_j^n ((AY_j - AY_{j-1})^2 + (BY_j - BY_{j-1})^2),$$

wherein Z' refers to the fitting cost function including the regularization item; λ refers to a constant item; $Y_j = [y_j^4, y_j^3, y_j^2, y_j^1, y_j^0]$; and $Y_{j-1} = [y_{j-1}^4, y_{j-1}^3, y_{j-1}^2, y_{j-1}^1, y_{j-1}^0]$.

In some embodiments, in Equation (16), $y_1$ may refer to the y coordinate of a pixel group j of the plurality of pixels groups (e.g., the $j^{th}$ row of pixels) in the target frame, and may refer to the y coordinate of a pixel group j−1 of the plurality of pixels groups (e.g., the (j−1)$^{th}$ row of pixels) in the target frame. The pixel group j−1 may be prior to or immediately following the pixel group j, and n may refer to a count of pixel groups in the target frame.

In some embodiments, the regularization item may be used to impose a constraint condition on the variation of the row offsets at boundary lines in the first curve and/or the variation of the column offsets at the boundary lines in the second curve. In Equation (16), $y_j$ may refer to the y coordinate of a boundary line j in the target frame, and $y_{j-1}$ may refer to the y coordinate of a boundary line j−1 in the target frame. The boundary line j−1 may be prior to or immediately following the boundary line j, and n may refer to a count of boundary lines in the target frame. Details regarding the boundary lines may be found elsewhere in the present disclosure (e.g., the description in connection with operation 1110 of a process 1100 in FIG. 11).

Figure 10A:
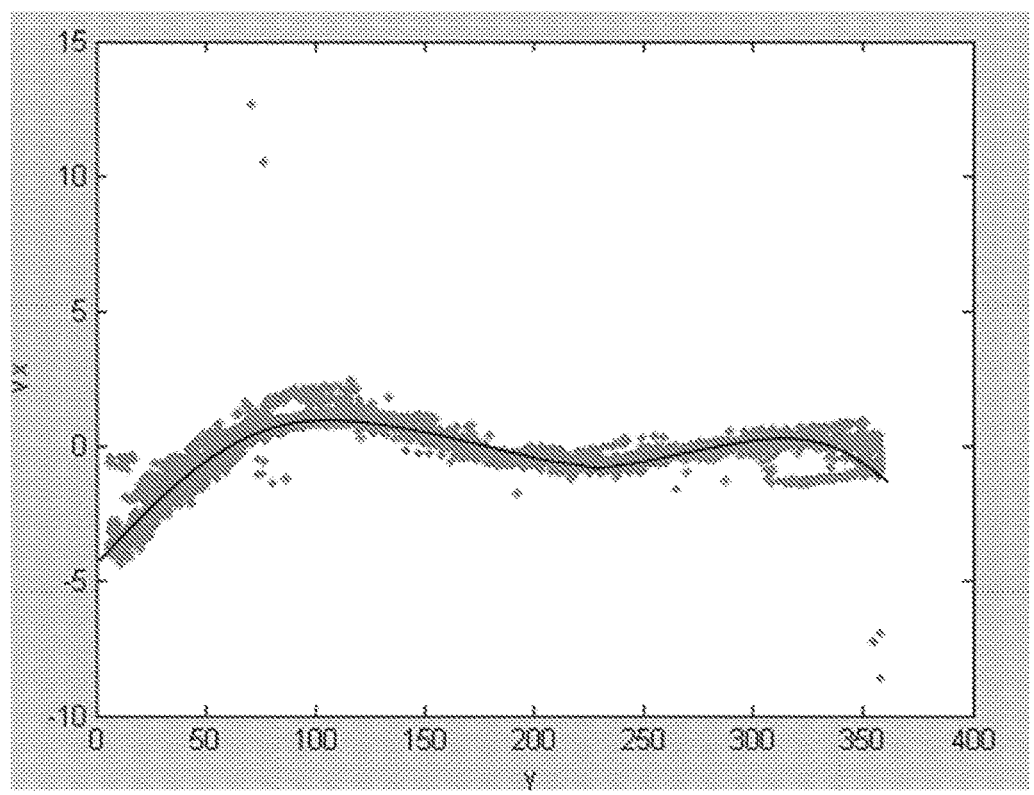
FIG. 10A is a schematic diagram illustrating an example of a first curve determined by performing curve fitting to the plurality of first discrete points according to some embodiments in the present disclosure.
Figure 10B:
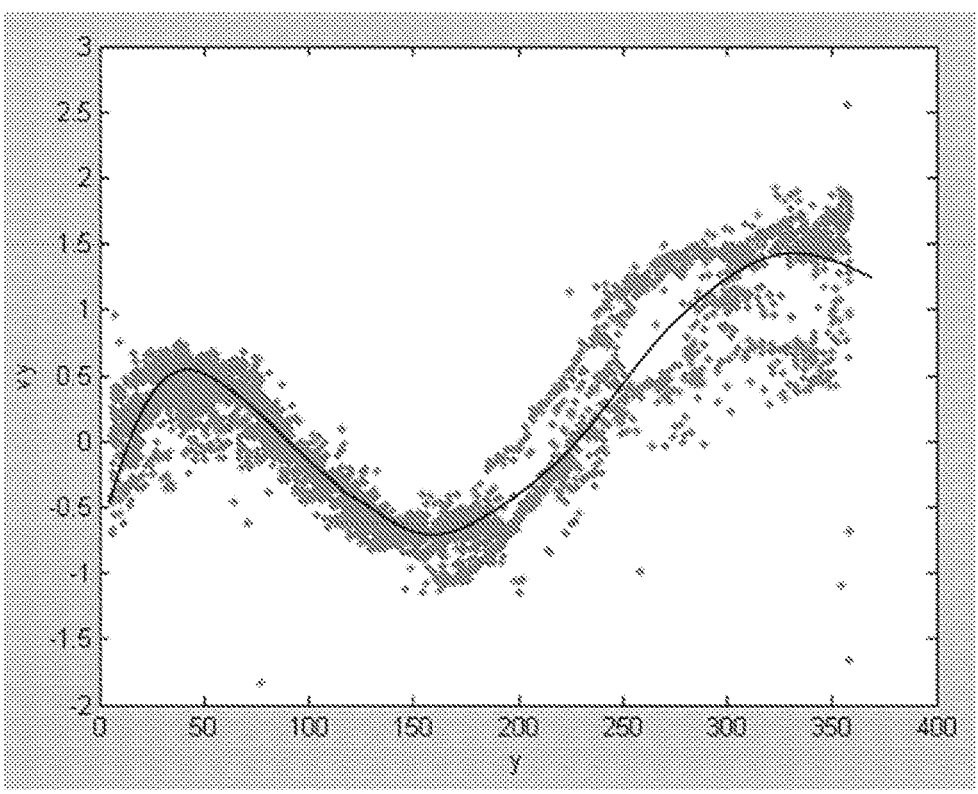
FIG. 10B is a schematic diagram illustrating an example of a second curve determined by performing curve fitting to the plurality of second discrete points according to some embodiments in the present disclosure.

The processing device 120 may perform the curve fitting based on the plurality of first discrete points shown in FIG. 9A and Equation (15) or Equation (16) to determine values of the parameters in Equation (11) and/or Equation (12), e.g., $A = [a_4 \ a_3 \ a_2 \ a_1 \ a_0]$, thereby obtaining the first curve (e.g., as shown in FIG. 10A) and/or the first polynomial curve function. The processing device 120 may perform the curve fitting based on the plurality of second discrete points shown in FIG. 9B and Equation (15) or Equation (16) to determine values of the parameters in Equation (13) and/or Equation (14), e.g., $B = [b_4 \ b_3 \ b_2 \ b_1 \ b_0]$, thereby obtaining the second curve (e.g., as shown in FIG. 10B) and/or the second polynomial curve function.

In some embodiments, in order to improve the precision of the curve fitting, the processing device 120 may perform curve fitting using, for example, an iteration process, a robust function, the inverse of an error to determine weights for the plurality of first feature points, or the like, or any combination thereof, in which the effect, on the curve fitting, of one or more bad points in the plurality of first feature points may be reduced or eliminated.

Figure 15:
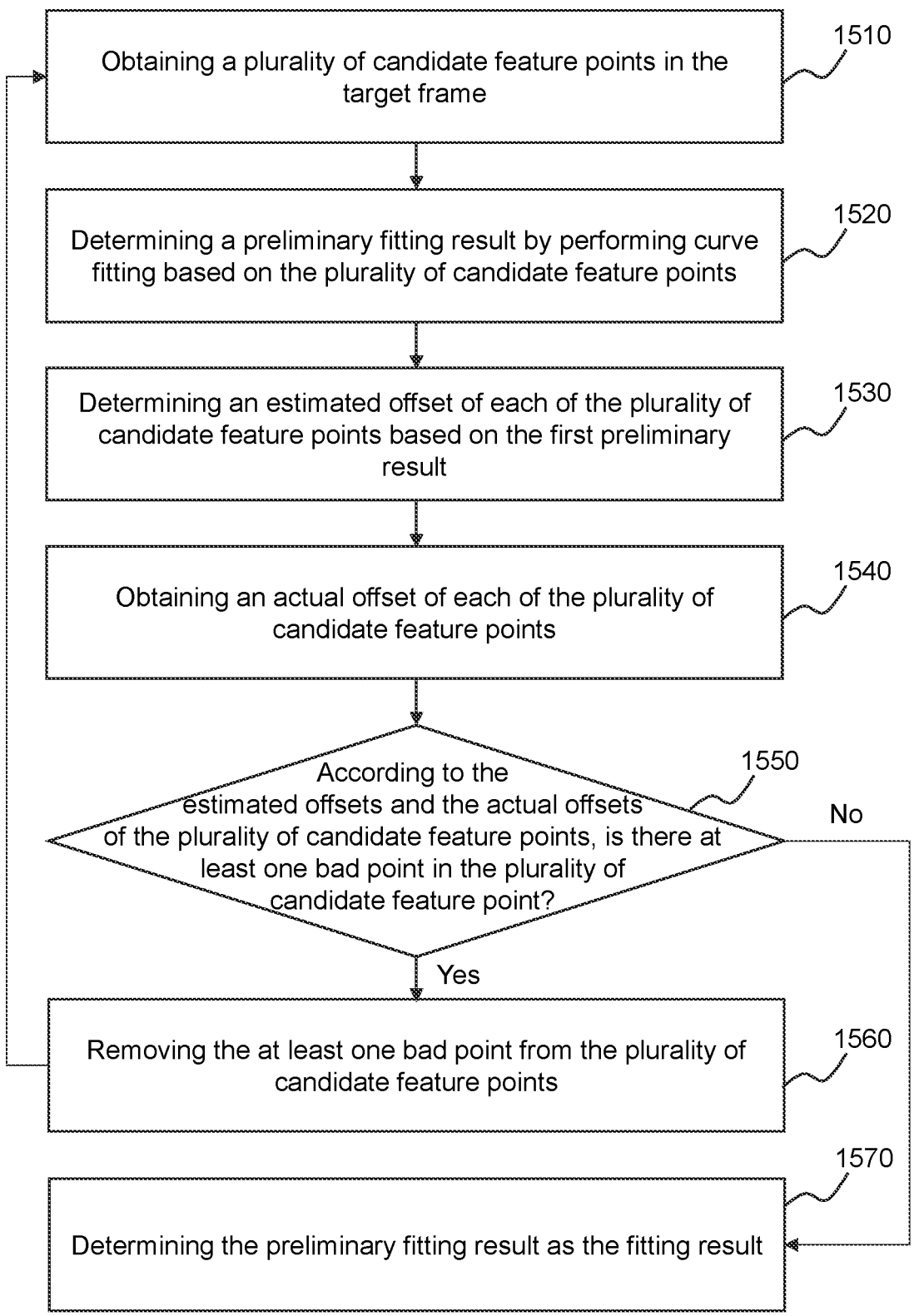
FIG. 15 is a flowchart illustrating an exemplary process for curve fitting based on an iteration process according to some embodiments of the present disclosure.

Details regarding the iteration process may be found elsewhere in the present disclosure (e.g., the description in connection with FIG. 15).

In 817, for each of the plurality of pixel groups, the processing device 120 (e.g., the first determination module 730) may determine a correction matrix based on the fitting result. Details regarding the determination of the correction matrix may be found elsewhere in the present disclosure (e.g., the description in connection with FIG. 11).

In 819, for each of the plurality of pixel groups, the processing device 120 (e.g., the processing module 750) may process the pixels in the pixel group based on the global homography matrix and the correction matrix.

In some embodiments, for each of the plurality of pixel groups, the processing device 120 (e.g., the second determination module 740) may determine a correction homography matrix based on the global homography matrix and the correction matrix. The processing device 120 (e.g., the processing module 750) may process the pixels in the pixel group based on the correction homography matrix.

In some embodiments, when a video is being captured in real time, every time the image capture device 110 captures a new frame of the video, the processing device 120 may perform video stabilization to the new frame based on the process 800. In some embodiments, the processing device 120 may perform, frame-by-frame, video stabilization to a video that has been completed based on the process 800.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may perform operation 811 between operation 801 and operation 813. The processing device 120 may perform operation 811 before or after at least one of operations 803-809. Or the processing device 120 may perform operation 811 simultaneously with one of operations 803-809.

FIG. 11 is a flowchart illustrating an exemplary process for determining a correction matrix for each of a plurality of pixel groups in a target frame according to some embodiments of the present disclosure. In some embodiments, the process 1100 may be implemented in the imaging system 100 illustrated in FIG. 1. For example, the process 1100 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 7). The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting. In some embodiments, the processing device 120 may perform operation 817 of the process 800 in FIG. 8 based on the process 1100.

In 1110, the processing device 120 (e.g., the section dividing module 710) may divide the plurality of pixel groups into a plurality of sections. Each of the plurality of sections may correspond to a boundary line. The boundary line may be one of the plurality of pixel groups.

In some embodiments, the way of dividing the plurality of pixel groups into the plurality of sections may include random dividing, dividing based on a preset rule, or the like.

Merely by way of example, the processing device 120 may divide the plurality of pixel groups in the target frame into a plurality of blocks. The processing device 120 may determine a plurality of boundary lines based on the plurality of blocks. The processing device 120 may determine the plurality of sections based on the plurality of boundary lines.

For example, FIG. 12 is a schematic diagram illustrating a plurality of exemplary sections in the target frame 1200 according to some embodiments of the present disclosure. As shown in FIG. 12, the image direction of the target image 1200 is the column direction (e.g., the Y direction in the target frame 1200 that is similar to the Y direction in the frame 600-1 in FIG. 6A) of the target frame 1200. Each of the plurality of pixel groups may be a row of pixels in the target frame 1200. The processing device 120 may divide the plurality of pixel groups into 4 blocks, such as block 1, block 2, block 3, and block 4 shown in FIG. 12. A count of the pixel groups included in each of the 4 blocks may be the same. For example, as shown in FIG. 12, block 1 may include the pixel group $y_0$, the pixel group $y_1$, and the pixel groups between $y_0$ and $y_1$. Block 2 may include the pixel group $y_2$ and the pixel groups between $y_2$ and $y_1$ (not include $y_1$). Block 3 may include the pixel group $y_3$ and the pixel groups between $y_3$ and $y_2$ (not include $y_2$). Block 4 may include the pixel group $y_4$ and the pixel groups between $y_4$ and $y_3$ (not include $y_3$).

In each of the 4 blocks, the processing device 120 may designate the pixel group located at the center location of the block as a boundary line (e.g., represented by $y_j$). For example, if there are 3 pixel groups in each block, the second pixel group (e.g., the second row of pixels) in each block may be designated as the boundary line. As another example, if there are 4 pixel groups in each block, the second or third pixel group (e.g., the second or third row of pixels) in each block may be designated as the boundary line. The processing device 120 may determine the plurality of sections based on the boundary lines.

For example, as shown in FIG. 12, the pixel groups $y_{j1}$-$y_{j4}$ may be the center pixel group of blocks 1-4, respectively. The processing device 120 may designate the pixel groups $y_{j1}$-$y_{j4}$ as the boundary lines. The processing device 120 may designate the pixel group $y_0$, the pixel group $y_{j1}$, and the pixel groups between $y_0$ and $y_{j1}$ as section 1. $y_{j1}$ may be the boundary line of section 1. The processing device 120 may designate the pixel group $y_{j1}$, the pixel group $y_{j2}$, and the pixel groups between $y_{j2}$ and $y_{j1}$ as section 2. $y_{j2}$ may be the boundary line of section 2. The processing device 120 may designate the pixel group $y_{j2}$, the pixel group $y_{j3}$, and the pixel groups between $y_{j2}$ and $y_{j3}$ as section 3. $y_{j3}$ may be the boundary line of section 3. The processing device 120 may designate the pixel group $y_{j3}$, the pixel group $y_{j4}$, and the pixel groups between $y_{j3}$ and $y_{j4}$ as section 4. $y_{j4}$ may be the boundary line of section 4. The processing device 120 may designate the pixel group $y_{j4}$, the pixel group $y_4$, and the pixel groups between $y_{j4}$ and $y_4$ as section 5. $y_{j4}$ may be the boundary line of section 5. In some embodiments, the relation between a boundary line and a section may be defined in advance.

For brevity, the description of the determination of the first correction matrix and the second correction matrix in operations 1120-1130 below may take the imaging direction that is the column direction as an example. If the imaging direction is the row direction, the determination of the first correction matrix and the second correction matrix may be similar to the description of the determination of the first correction matrix and the second correction matrix in which the imaging direction is the column direction.

In 1120, the processing device 120 (e.g., the first determination module 730) may determine, for each of the boundary lines, a first correction matrix based on the fitting result.

In some embodiments, for each of the boundary lines, the processing device 120 may determine a first set of linear parameters by putting the y coordinate of the first location information of the boundary line into a first derivative of the first polynomial curve function. The processing device 120 may determine a second set of linear parameters by putting the y coordinate of the first location information of the boundary line into a first derivative of the second polynomial curve function. The processing device 120 may determine the first correction matrix of the boundary line based on the first set of linear parameters and the second set of linear parameters.

Figure 13:
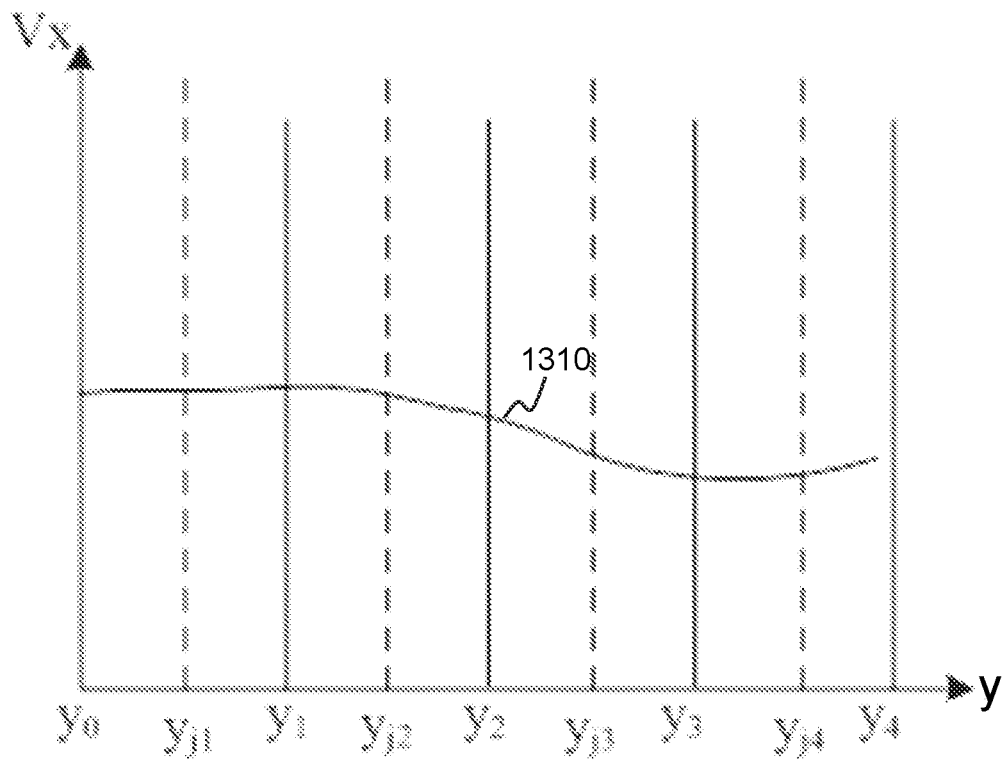
FIG. 13 is a schematic diagram illustrating an exemplary first curve according to some embodiments in the present disclosure.
Figure 14:
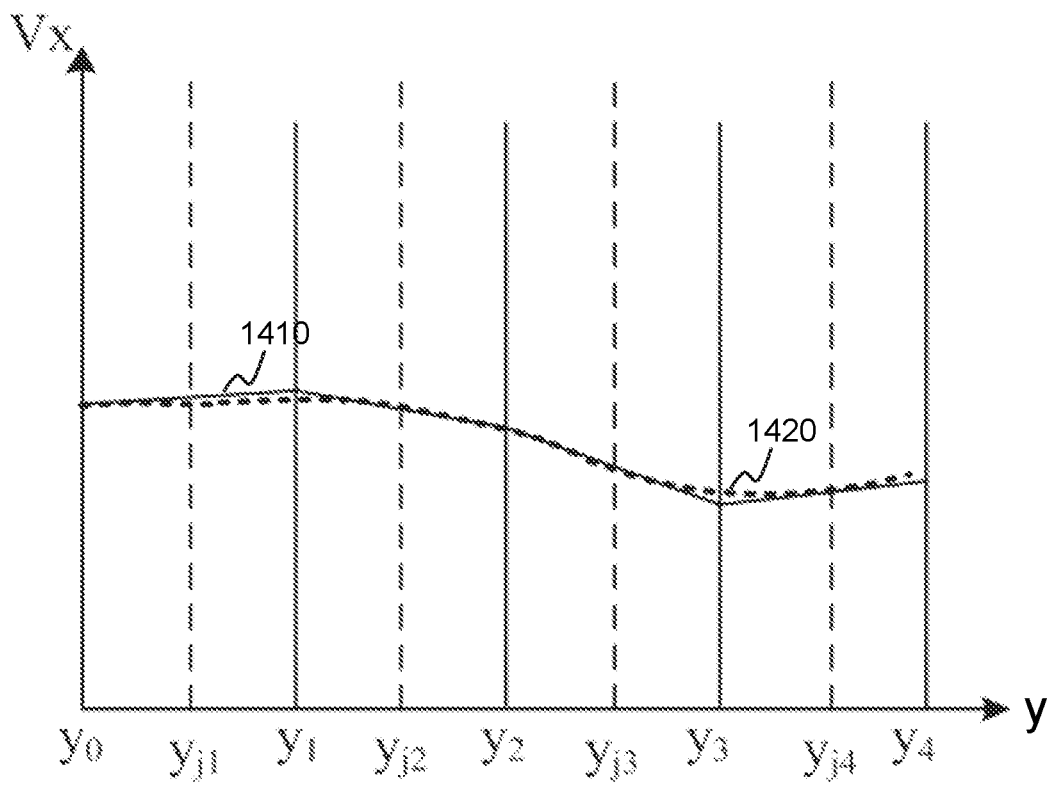
FIG. 14 is a schematic diagram illustrating an exemplary curve illustrating a first linear function related to a first curve according to some embodiments in the present disclosure.

FIG. 13 is a schematic diagram illustrating an exemplary first curve according to some embodiments in the present disclosure. For example, as shown in FIG. 13, if the plurality of pixel groups in the target frame are divided into a plurality of blocks (e.g., 4 blocks shown in FIG. 12), a portion of the first curve (e.g., curve 1310 in FIG. 13) and/or a portion of the second curve corresponding to each of the plurality of blocks may be approximately regarded as a straight line. For a portion of the first polynomial curve function of the first curve corresponding to each of the plurality of blocks, the processing device 120 may determine a first linear function (e.g., the solid line 1410 shown in FIG. 14). In FIG. 14, the dash line 1420 may correspond to the first curve 1310 in FIG. 13. For a portion of the second polynomial curve function of the second curve corresponding to each of the plurality of blocks, the processing device 120 may determine a second linear function. The first linear function may indicate a linear relation between the y coordinates of the first location information and the row offsets of the first feature points in each of the plurality of blocks. The second linear function may indicate a linear relation between the y coordinates of the first location information and the column offsets of the first feature points in each of the plurality of blocks.

For example, the first linear function and the second linear function may be represented as Equation (17) and Equation (18) below, respectively:

$$Lx(y) = K_1 \times y + C_1 \quad (17),$$

and $$Ly(y) = K_2 \times y + C_2 \quad (18),$$

wherein $Lx(y)$ and $Ly(y)$ refer to the first linear function and the second linear function corresponding to one of the plurality of blocks, respectively; $K_1$ and $C_1$ refer to the first set of parameters of the first linear function; and $K_2$ and $C_2$ refer to the second set of parameters of the second linear function.

In some embodiments, for each of the plurality of blocks, the processing device 120 may determine $K_1$ by determining a derivative of the first polynomial curve function based on the y coordinate of the boundary line (e.g., $y_j$) in the block. The processing device 120 may determine $K_2$ by determining a derivative of the second polynomial curve function based on the y coordinate of the boundary line (e.g., $y_j$) in the block. For example, the processing device 120 may determine $K_1$, $C_1$, $K_2$, and $C_2$ based on Equations (19)-(22) below:
and $$K_1 = \frac{\partial Vx}{\partial y}(y_j), \quad (19)$$

$$C_1 = Vx(y_j) - K_1 \times y_j, \quad (20)$$

$$K_2 = \frac{\partial Vy}{\partial y}(y_j), \quad (21)$$

$$C_2 = Vy(y_j) - K_2 \times y_j. \quad (22)$$

For example, $P_4$ is a pixel in a boundary line in the target frame, and $P_5$ is the corresponding pixel in the previous frame. The processing device 120 may determine the first correction matrix of the boundary line based on Equation (23) below:

$$P_5 \approx H'_g \times P_4 + [K_1 \times y_4 + C_1 \quad K_2 \times y_4 + C_2 \quad 0]^T = \quad (23)$$

$$H_g \times P_4 + \begin{bmatrix} 0 & K_1 & C_1 \\ 0 & K_2 & C_2 \\ 0 & 0 & 0 \end{bmatrix} \begin{bmatrix} x_4 \\ y_4 \\ 1 \end{bmatrix} = \left( H_g + \begin{bmatrix} 0 & K_1 & C_1 \\ 0 & K_2 & C_2 \\ 0 & 0 & 0 \end{bmatrix} \right) P_4 = H_b \times P_4$$

wherein $$P_4 = \begin{bmatrix} x_4 \\ y_4 \\ 1 \end{bmatrix},$$

and $x_4$ and $y_4$ refer to the x coordinate and the y coordinate of the first location information of the feature point $P_4$ in the target frame, respectively.

According to Equation (23), the first correction matrix $H_j$ of the boundary line may be $$H_j = \begin{bmatrix} 0 & K_1 & C_1 \\ 0 & K_2 & C_2 \\ 0 & 0 & 0 \end{bmatrix},$$

and the correction homography matrix of the boundary line may be $$H_b = H_g + H_j = H_g + \begin{bmatrix} 0 & K_1 & C_1 \\ 0 & K_2 & C_2 \\ 0 & 0 & 0 \end{bmatrix}.$$

In some embodiments, the processing device 120 may determine the first correction matrix for each of the plurality of boundary lines based on Equations (19)-(23).

In 1130, for each of the plurality of pixel groups excluding the boundary lines (also referred to as the remained pixel groups), the processing device 120 (e.g., the first determination module 730) may determine a second correction matrix based on the first correction matrix of the boundary line adjacent to the remained pixel group.

In some embodiments, the processing device 120 may determine the second correction matrix of the remained pixel based on the first correction matrix of the boundary line adjacent to the remained pixel group using linear interpolation.

Merely by way of example, the processing device 120 may determine the second correction matrix of the remained pixel group by determining a weighted average of the first correction matrix of the boundary line adjacent to the remained pixel group.

In some embodiments, a weight for the first correction matrix of the boundary line adjacent to the remained pixel group may be determined based on the distance between the boundary line adjacent to the remained pixel group and the remained pixel group. Further, the weight for the first correction matrix of the boundary line adjacent to the remained pixel group may be determined based on a ratio of the distance between the remained pixel group and the boundary line adjacent to the remained pixel group to a count of pixel groups in the section including the remained pixel group. The shorter the distance is, the more relevant the second correction matrix of the remained pixel group may be to the first correction matrix of the boundary line adjacent to the remained pixel group, and the greater the weight of the first correction matrix of the boundary line adjacent to the remained pixel group may be.

For example, the target frame may include 1080 pixel groups (e.g., 108 rows of pixels). Along the imaging direction, e.g., from the top to the bottom, from the bottom to the tow, from the right to the left, or from the left to the right of the target frame, the 1080 pixel groups may be designated as the $1^{st}$ pixel group, the $2^{nd}$ pixel group, the $3^{rd}$ pixel group, the $4^{th}$ pixel group, . . . , and the $1080^{th}$ pixel group, respectively. The processing device 120 may divide the 108 pixel groups into 10 blocks each of which includes 108 pixel groups. For example, the first block may include the first pixel group to the $108^{th}$ pixel group. The second block may include the $109^{th}$ pixel group to the $(108*2)^{th}$ pixel group. The third block may include the $(108*2+1)^{th}$ pixel group to the $(108*3)^{th}$ pixel group, and so on.

In each of the 10 blocks, the processing device 120 may determine the pixel group located at the center location of the block (also referred to as the center pixel group of the block) as the boundary line. The center pixel group of the first block may be the $54^{th}$ pixel group that is the boundary line of the first section. The center pixel group of the second block may be the $(54+108)^{th}$ pixel group that is the boundary line of the second section. The center pixel group of the third block may be the $(54+108+108)^{th}$ pixel group that is the boundary line of the third section, and so on.

The first correction matrix of the boundary line of the first section may be $H_{j1}$. The first correction matrix of the boundary line of the second section may be $H_{j2}$. The first correction matrix of the boundary line of the third section may be $H_{j3}$, and so on.

Merely by way of example, for the $90^{th}$ pixel group, the boundary lines adjacent to the $90^{th}$ pixel group may the $54^{th}$ pixel group and the $162^{nd}$ pixel group. A distance between the $90^{th}$ pixel group and the $54^{th}$ pixel group may be 36. A distance between the $90^{th}$ pixel group and the $162^{nd}$ pixel group may be 72. The processing device 120 may determine the second correction matrix of the $90^{th}$ pixel group based on Equation (24) below:

$$H_j(y=90)=H_{j1}*[(162-90)/108]+H_{j2}*[(90-54)/108] \quad (24)$$

The processing device 120 may determine $(H_g+H_j)(y=90)$ as the correction homography matrix of the $90^{th}$ pixel group. The processing device 120 may correct the pixels in the $90^{th}$ pixel group using the correction homography matrix of the $90^{th}$ pixel group.

In some embodiments, if each of the plurality of blocks includes one pixel group, each of the plurality of blocks may also be a section, and each of the plurality of pixel groups may be a boundary line. The processing device 120 may determine the correction matrix of each of the plurality of pixel groups based on operation 1120.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 15 is a flowchart illustrating an exemplary process for curve fitting based on an iteration process according to some embodiments of the present disclosure. In some embodiments, the process 1500 may be implemented in the imaging system 100 illustrated in FIG. 1. For example, the process 1500 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 7). The operations of the illustrated process 1500 presented below are intended to be illustrative. In some embodiments, the process 1500 may be accomplished with one or more additional operations not described, and/or without one or more of the operations discussed. Additionally, the order in which the operations of the process 1500 as illustrated in FIG. 15 and described below is not intended to be limiting. In some embodiments, the processing device 120 may perform operation 815 of the process 800 in FIG. 8 based on the process 1500.

For brevity, the description of the curve fitting in FIG. 15 may take the imaging direction that is the column direction as an example. If the imaging direction is the row direction, the curve fitting may be similar to the description of the curve fitting in which the imaging direction is the column direction.

Due to the camera's vibration, there may be offsets between the locations of the pixels in the target frame and the locations of the corresponding pixels in the previous frame. The offsets of the pixels representing a static object (e.g., the background of the scene) in the scene may be different from the offsets of the pixels representing a moving object in the scene.

For example, for a case in which the camera does not move and the scene includes a moving object and a static background, the feature points representing the background in the captured images may better reflect the camera's vibration. For example, if the position of the feature points representing the background in the target frame does not change relative to the position of the corresponding feature points in the previous frame, the camera may be considered to be static. If the vibration of the camera is analyzed based on the positions of the feature points representing a moving object, it may be inaccurate.

In some embodiments, in the iteration process for curve fitting, the processing device 120 may first determine a preliminary fitting result by performing curve fitting based on all of the plurality of first feature points, for example, all of the plurality of first discrete points in FIG. 9A and all of the plurality of second discrete points in FIG. 9B. The processing device 120 may determine an estimated offset of each of the plurality of first feature points based on the preliminary fitting result. For each of the plurality of first feature points, the processing device 120 may compare the estimated offset to the actual offset of the first feature point. The processing device 120 may remove one or more of the plurality of first feature points of which a difference between the estimated offset and the actual offset is greater than a preset threshold. The processing device 120 may perform curve fitting based on the remained first feature points of the plurality of first feature points.

Specifically, the iteration process for curve fitting in which the effect, on the curve fitting, of one or more bad points in the plurality of first feature points may be reduced or eliminated may include one or more iterations each of which may include, for example, operations 1510-1570.

In 1510, the processing device 120 (e.g., the first determination module 730) may obtain a plurality of candidate feature points in the target frame. In some embodiments, in the first iteration of the iteration process, the plurality of candidate feature points may be all of the plurality of first feature points in the target frame. In some embodiments, in an iteration other than the first iteration of the iteration process, the plurality of candidate feature points may be the remained first feature points in the plurality of first feature points.

In 1520, the processing device 120 (e.g., the first determination module 730) may determine a preliminary fitting result by perform curve fitting based on the plurality of candidate feature points.

In some embodiments, the processing device 120 may determine a first preliminary polynomial curve function V'x(y)=A'×Y by performing curve fitting to the y coordinates of the first location information and the row offsets of the plurality of candidate feature points based on Equation (15) or Equation (16). The processing device 120 may determine a second preliminary polynomial curve function V'y(y)=B'×Y by performing curve fitting to the y coordinates of the first location information and the column offsets of the plurality of candidate feature points based on Equation (15) or Equation (16). The preliminary fitting result may include the first preliminary polynomial curve function and the second preliminary polynomial curve function.

In 1530, the processing device 120 (e.g., the first determination module 730) may determine an estimated offset of each of the plurality of candidate feature points based on the preliminary fitting result.

In some embodiments, the estimated offset of the candidate feature point may include an estimated row offset and an estimated column offset. The processing device 120 may determine the estimated row offset and the estimated column offset based on the first preliminary polynomial curve function and the second preliminary polynomial curve function. For example, the processing device 120 may determine the estimated row offset of the candidate feature point $P_k$ by putting $P_k=[x_k\ y_k\ 1]^T$ into the first preliminary polynomial curve function. The processing device 120 may determine the estimated column offset of the candidate feature point $P_k$ by putting $P_k=[x_k\ y_k\ 1]^T$ into the second preliminary polynomial curve function. $x_k$ and $y_k$ refers to the x coordinate and the y coordinate of the first location information of the candidate feature point $P_k$.

In 1540, the processing device 120 (e.g., the first determination module 730) may obtain an actual offset of each of the plurality of candidate feature points.

In some embodiments, the actual offset of the candidate feature point may include an actual row offset and an actual column offset. The processing device 120 may determine the actual row offset and the actual column offset of the candidate feature point based on Equation (8) and/or the plurality of first discrete points in FIG. 9A and the plurality of second discrete points in FIG. 9B.

In 1550, the processing device 120 (e.g., the first determination module 730) may determine whether there is at least one bad point in the plurality of candidate feature points based on the estimated offsets and the actual offsets of the plurality of candidate feature points. In response to a determination that there is at least one bad point in the plurality of candidate feature points, the process 1500 may proceed to operation 1560 in which the processing device 120 may remove the at least one bad point from the plurality of candidate feature points. Then the processing device 120 may initiate a new iteration. In response to a determination that there is no bad point in the plurality of candidate feature points, the iteration process may be terminated and the process 1500 may proceed to operation 1570 in which the processing device 120 may determine the preliminary fitting result determined in the last iteration as the fitting result (e.g., the fitting result in operation 815 of the process 800 in FIG. 8).

In some embodiments, for each of the at least one of the plurality of candidate feature points, the processing device 120 may determine whether a preset condition is satisfied. In response to a determination that the preset condition is satisfied, the processing device 120 may determine that the candidate feature point is the bad point. In response to a determination that the preset condition is not satisfied, the processing device 120 may determine that the candidate feature point is not the bad point.

In some embodiments, the preset condition may include a first condition that a first difference between the estimated row offset and the actual row offset of the candidate feature point is greater than a first threshold, a second condition that a second difference between the estimated column offset and the actual column offset of the candidate feature point is greater than a second threshold, a third condition that a sum of the first difference and the second difference is greater than a third threshold, or the like, or any combination thereof.

For example, the third condition may be represented as Equation (17) below:

$$|Vx_{est}-Vx_{act}|+|Vy_{est}-Vy_{act}|>thr \qquad (17),$$

wherein $Vx_{est}$ refers to the estimated row offset of the candidate feature point; $Vx_{act}$ refers to the actual row offset of the candidate feature point; $Vy_{est}$ refers to the estimated column offset of the candidate feature point; $Vy_{act}$ refers to the actual column offset of the candidate feature point; and thr refers to the third threshold.

In some embodiments, at least one of the one or more iterations of the iteration process may further include an operation in which the processing device 120 may determine whether a termination condition is satisfied after operation 1520 and before operation 1530. In response to a determination that the termination condition is satisfied, the iteration process may be terminated and the process 15200 may proceed to operation 1570. In response to a determination that the termination condition is not satisfied, the process 1500 may proceed to operation 1530.

In some embodiments, the termination condition may include a condition that a count of iterations that have been performed is equal to an iteration threshold.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1540 may be performed between operation 1510 and operation 1550 and may be performed before, after, or simultaneously with operation 1520 or operation 1530.

FIG. 16 is a flowchart illustrating an exemplary process for video stabilization according to some embodiments of the present disclosure. In some embodiments, the process 1600 may be implemented in the imaging system 100 illustrated in FIG. 1. For example, the process 1600 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 7). The operations of the illustrated process 1600 presented below are intended to be illustrative. In some embodiments, the process 1600 may be accomplished with one or more additional operations not described, and/or without one or more of the operations discussed. Additionally, the order in which the operations of the process 1600 as illustrated in FIG. 16 and described below is not intended to be limiting.

In 1601, the processing device 120 (e.g., the section dividing module 710) may divide a target frame into N sections based on an imaging direction of the target frame. In the embodiment of FIG. 16, the imaging direction of the target frame may be column direction of the target frame.

The target frame may include a plurality of pixels arranged in rows and columns. The processing device 120 may divide the plurality of pixels into a plurality of pixel groups based on the imaging direction of the target frame. The processing device 120 may divide the plurality of pixel groups into a plurality of blocks. The processing device 120 may determine the pixel group located at the center location of each of the plurality of blocks as a boundary line. The processing device 120 may determine the N sections based on the boundary lines. Each of the N sections may correspond to one of the boundary lines.

In 1603, the processing device 120 (e.g., the offset determination module 720) may determine K feature points in the target frame, track coordinates of the K feature points in a frame prior to the target frame, select m of the K feature points, and determine a global homography matrix $H_g$ based on the m feature points.

In 1605, the processing device 120 (e.g., the offset determination module 720) may determine an offset of each of the plurality of pixels in the target frame based on $[V_x\ V_y\ 0]^T = P_3 - H_g * P_2$ (e.g., Equation (8)).

In some embodiments, for each of the plurality of pixels in the target frame, the processing device 120 may determine the offset based on the coordinates of the pixel processed by the affine transformation and coordinates of the corresponding pixel in the frame prior to the target frame.

In 1607, the processing device 120 (e.g., the first determination module 730) may determine a fitting result by performing curve fitting to a plurality of first discrete points and a plurality of second discrete points. The first plurality of discrete points may indicate the y coordinates and Vx of the plurality of pixels in the target frame. The second plurality of discrete points may indicate the y coordinates and Vy of the plurality of pixels in the target frame.

In 1609, the processing device 120 (e.g., the first determination module 730) may determine a first correction matrix for each of the plurality of boundary lines by performing linearization to a portion of the fitting result corresponding to each of the plurality of blocks.

In some embodiments, the fitting result may include a first polynomial curve function and a second polynomial curve function. The first polynomial curve function may indicate a relation between the y coordinates and Vx of the plurality of pixels in the target frame. The second polynomial curve function may indicate a relation between the y coordinates and Vy of the plurality of pixels in the target frame. For each of the plurality of boundary lines, the processing device 120 may determine a first set of linear parameters by putting the y coordinate of the boundary line into a first derivative of the first polynomial curve function. The processing device 120 may determine a second set of linear parameters by putting the y coordinate of the boundary line into a first derivative of the second polynomial curve function. The processing device 120 may determine the first correction matrix of the boundary line based on the first set of linear parameters and the second set of linear parameters.

In 1611, for each of the plurality of pixel groups excluding the plurality of boundary lines (also referred to as remained pixel groups), the processing device 120 (e.g., the first determination module 730) may determine a second correction matrix by determining a weighted average of the first correction matrixes of the boundary lines adjacent to the remained pixel group based on a distance between the remained pixel group and the boundary lines adjacent to the remained pixel group.

In 1613, for each of the plurality of pixel groups, the processing device 120 (e.g., the second determination module 740) may determine a correction homography matrix based on the global homography matrix $H_g$ and the correction matrix of the pixel group (e.g., the first correction matrix or the second correction matrix).

In 1615, for each of the plurality of pixel groups, the processing device 120 (e.g., the processing module 750) may correct the pixels in the pixel group based on the correction homography matrix.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for video stabilization, comprising:
at least one storage device storing a set of instructions; and
at least one processor in communication with the at least one storage device, wherein when executing the set of instructions, the at least one processor is configured to perform operations including:
obtaining a target frame of a video, the target frame including a plurality of pixels arranged in rows and columns;
dividing the plurality of pixels into a plurality of pixel groups based on an imaging direction of the target frame;
determining a plurality of first feature points in the target frame;
determining first location information of the plurality of first feature points in the target frame;
determining second location information of the plurality of first feature points in a frame prior to the target frame in the video;
obtaining a global homography matrix;
determining an offset of each of the plurality of first feature points based on the global homography matrix, the first location information, and the second location information;
determining a fitting result by performing curve fitting based on the first location information and the offsets of the plurality of first feature points;
for each of the plurality of pixel groups, determining a correction matrix based on the fitting result; and
for each of the plurality of pixel groups, processing the pixels in the pixel group based on the global homography matrix and the correction matrix.

2. The system of claim 1, wherein to determine the offset of the each of the plurality of first feature points based on the global homography matrix, the first location information, and the second location information, the at least one processor is configured to perform operations including:
performing affine transformation to the first location information of the first feature point based on the global homography matrix; and
determining the offset of the first feature point based on the transformed first location information of the first feature point and the second location information of the first feature point.

3. The system of claim 1, wherein to determine, for each of the plurality of pixel groups, the correction matrix based on the fitting result, the at least one processor is configured to perform operations including:
dividing the plurality of pixel groups into a plurality of sections, each of the plurality of sections corresponding to a boundary line, the boundary line being one of the plurality of pixel groups;
for each of the boundary lines, determining a first correction matrix based on the fitting result; and
for each of the plurality of pixel groups excluding the boundary lines, determining a second correction matrix based on the first correction matrix of the boundary line adjacent to the pixel group.

4. The system of claim 3, wherein
the offset of the first feature point includes a row offset and a column offset, and the first location information of each of the plurality of first feature points includes a row coordinate and a column coordinate;
the imaging direction of the target frame relates to row imaging along a column direction of the target frame, and each of the plurality of pixel groups includes a row of pixels of the plurality of pixels in the target frame; and to determine the fitting result by performing curve fitting based on the first location information and the offsets of the plurality of first feature points, the at least one processor is configured to perform operations including:

determining a first polynomial curve equation by performing first curve fitting based on the row coordinates and the row offsets of the plurality of first feature points; and determining a second polynomial curve equation by performing second curve fitting based on the row coordinates and the column offsets of the plurality of first feature points;

wherein the fitting result includes the first polynomial curve function and the second polynomial curve function.

5. The system of claim 4, wherein for each of the boundary lines, to determine the first correction matrix based on the fitting result, the at least one processor is configured to perform operations including:

determining a first set of parameters related to the boundary line based on the first polynomial curve equation, the first set of parameters indicating a linear relation in the first polynomial curve equation between the row coordinates and the row offsets of the first feature points that are located in the boundary line;

determining a second set of parameters related to the boundary line based on the second polynomial curve equation, the second set of parameters indicating a linear relation in the second polynomial curve equation between the row coordinates and the column offsets of the first feature points that are located in the boundary line; and determining the first correction matrix of the boundary line based on the first set of parameters and the second set of parameters.

6. The system of claim 3, wherein the offset of the first feature point includes a row offset and a column offset, and the first location information of each of the plurality of first feature points includes a row coordinate and a column coordinate;

the imaging direction of the target frame relates to column imaging along a row direction of the target frame, and each of the plurality of pixel groups includes a column of pixels of the plurality of pixels in the target frame; and to determine the fitting result by performing curve fitting based on the first location information of the plurality of first feature points and the offsets of the plurality of first feature points, the at least one processor is configured to perform operations including:

determining a third polynomial curve equation by performing third curve fitting based on the column coordinates and the row offsets of the plurality of first feature points; and determining a fourth polynomial curve equation by performing fourth curve fitting based on the column coordinates and the column offsets of the plurality of first feature points;

wherein the fitting result includes the third polynomial curve function and the fourth polynomial curve function.

7. The system of claim 6, wherein for each of the one or more boundary lines, to determine the first correction matrix based on the fitting result, the at least one processor is configured to perform operations including:

determining a third set of parameters related to the boundary line based on the third polynomial curve equation, the third set of parameters indicating a linear relation in the third polynomial curve equation between the column coordinates and the row offsets of the first feature points that are located in the boundary line;

determining a fourth set of parameters related to the boundary line based on the fourth polynomial curve equation, the fourth set of parameters indicating a linear relation in the fourth polynomial curve equation between the column coordinates and the column offsets of the first feature points that are located in the boundary line; and determining the first correction matrix of the boundary line based on the third set of parameters and the fourth set of parameters.

8. The system of claim 3, wherein for each of the plurality of pixel groups excluding the boundary lines, to determine the second correction matrix based on the first correction matrix of the boundary line adjacent to the pixel group, the at least one processor is configured to perform operations including:

determining a distance between the pixel group and the boundary line adjacent to the pixel group;

determining a ratio between the distance and a count of pixels groups in the section including the pixel group; and determining the second correction matrix of the pixel group based on the ratio and the first correction matrix of the boundary line adjacent to the pixel group.

9. The system of claim 1, wherein to determine the fitting result by performing curve fitting based on the first location information and the offsets of the plurality of first feature points, the at least one processor is configured to perform operations including:

performing the curve fitting based on the first location information of the plurality of first feature points and the offsets of the plurality of first feature points using a fitting cost function, wherein the fitting cost function includes a least square error function or the least square error function plus a regularization item.

10. The system of claim 1, wherein to process, for each of the plurality of pixel groups, the pixels in the pixel group based on the global homography matrix and the correction matrix, the at least one processor is configured to perform operations including:

for each of the plurality of pixel groups, determining a correction homography matrix based on the global homography matrix and the correction matrix; and processing the pixels in the pixel group based on the correction homography matrix.

11. A method for video stabilization implemented on a machine having one or more storage devices and one or more processors, the method comprising:

obtaining a target frame of a video, the target frame including a plurality of pixels arranged in rows and columns;

dividing the plurality of pixels into a plurality of pixel groups based on an imaging direction of the target frame;

determining a plurality of first feature points in the target frame;

determining first location information of the plurality of first feature points in the target frame;

determining second location information of the plurality of first feature points in a frame prior to the target frame in the video;

obtaining a global homography matrix;

determining an offset of each of the plurality of first feature points based on the global homography matrix, the first location information, and the second location information;

determining a fitting result by performing curve fitting based on the first location information and the offsets of the plurality of first feature points;

for each of the plurality of pixel groups, determining a correction matrix based on the fitting result; and for each of the plurality of pixel groups, processing the pixels in the pixel group based on the global homography matrix and the correction matrix.

12. The method of claim 11, wherein the determining the offset of the each of the plurality of first feature points based on the global homography matrix, the first location information, and the second location information includes:

performing affine transformation to the first location information of the first feature point based on the global homography matrix; and determining the offset of the first feature point based on the transformed first location information of the first feature point and the second location information of the first feature point.

13. The method of claim 11, wherein the determining, for each of the plurality of pixel groups, the correction matrix based on the fitting result includes:

dividing the plurality of pixel groups into a plurality of sections, each of the plurality of sections corresponding to a boundary line, the boundary line being one of the plurality of pixel groups;

for each of the boundary lines, determining a first correction matrix based on the fitting result; and for each of the plurality of pixel groups excluding the boundary lines, determining a second correction matrix based on the first correction matrix of the boundary line adjacent to the pixel group.

14. The method of claim 13, wherein the offset of the first feature point includes a row offset and a column offset, and the first location information of each of the plurality of first feature points includes a row coordinate and a column coordinate;

the imaging direction of the target frame relates to row imaging along a column direction of the target frame, and each of the plurality of pixel groups includes a row of pixels of the plurality of pixels in the target frame; and the determining the fitting result by performing curve fitting based on the first location information and the offsets of the plurality of first feature points includes:

determining a first polynomial curve equation by performing first curve fitting based on the row coordinates and the row offsets of the plurality of first feature points; and determining a second polynomial curve equation by performing second curve fitting based on the row coordinates and the column offsets of the plurality of first feature points;

wherein the fitting result includes the first polynomial curve function and the second polynomial curve function.

15. The method of claim 14, wherein for each of the boundary lines, the determining the first correction matrix based on the fitting result includes:

determining a first set of parameters related to the boundary line based on the first polynomial curve equation, the first set of parameters indicating a linear relation in the first polynomial curve equation between the row coordinates and the row offsets of the first feature points that are located in the boundary line;

determining a second set of parameters related to the boundary line based on the second polynomial curve equation, the second set of parameters indicating a linear relation in the second polynomial curve equation between the row coordinates and the column offsets of the first feature points that are located in the boundary line; and determining the first correction matrix of the boundary line based on the first set of parameters and the second set of parameters.

16. The method of claim 13, wherein the offset of the first feature point includes a row offset and a column offset, and the first location information of each of the plurality of first feature points includes a row coordinate and a column coordinate;

the imaging direction of the target frame relates to column imaging along a row direction of the target frame, and each of the plurality of pixel groups includes a column of pixels of the plurality of pixels in the target frame; and the determining the fitting result by performing curve fitting based on the first location information of the plurality of first feature points and the offsets of the plurality of first feature points includes:

determining a third polynomial curve equation by performing third curve fitting based on the column coordinates and the row offsets of the plurality of first feature points; and determining a fourth polynomial curve equation by performing fourth curve fitting based on the column coordinates and the column offsets of the plurality of first feature points;

wherein the fitting result includes the third polynomial curve function and the fourth polynomial curve function.

17. The method of claim 16, wherein for each of the one or more boundary lines, the determining the first correction matrix based on the fitting result includes:

determining a third set of parameters related to the boundary line based on the third polynomial curve equation, the third set of parameters indicating a linear relation in the third polynomial curve equation between the column coordinates and the row offsets of the first feature points that are located in the boundary line;

determining a fourth set of parameters related to the boundary line based on the fourth polynomial curve equation, the fourth set of parameters indicating a linear relation in the fourth polynomial curve equation between the column coordinates and the column offsets of the first feature points that are located in the boundary line; and determining the first correction matrix of the boundary line based on the third set of parameters and the fourth set of parameters.

18. The method of claim 13, wherein for each of the plurality of pixel groups excluding the boundary lines, the determining the second correction matrix based on the first correction matrix of the boundary line adjacent to the pixel group includes:

determining a distance between the pixel group and the boundary line adjacent to the pixel group;

determining a ratio between the distance and a count of pixels groups in the section including the pixel group; and determining the second correction matrix of the pixel group based on the ratio and the first correction matrix of the boundary line adjacent to the pixel group.

19. The method of claim 11, wherein the determining the fitting result by performing curve fitting based on the first location information and the offsets of the plurality of first feature points includes:

performing the curve fitting based on the first location information of the plurality of first feature points and the offsets of the plurality of first feature points using a fitting cost function, wherein the fitting cost function includes a least square error function or the least square error function plus a regularization item.

20. A non-transitory computer readable medium, comprising at least one set of instructions for video stabilization, wherein when executed by one or more processors of a computing device, the at least one set of instructions causes the computing device to perform a method, the method comprising:

obtaining a target frame of a video, the target frame including a plurality of pixels arranged in rows and columns;

dividing the plurality of pixels into a plurality of pixel groups based on an imaging direction of the target frame;

determining a plurality of first feature points in the target frame;

determining first location information of the plurality of first feature points in the target frame;

determining second location information of the plurality of first feature points in a frame prior to the target frame in the video;

obtaining a global homography matrix;

determining an offset of each of the plurality of first feature points based on the global homography matrix, the first location information, and the second location information;

determining a fitting result by performing curve fitting based on the first location information and the offsets of the plurality of first feature points;

for each of the plurality of pixel groups, determining a correction matrix based on the fitting result; and for each of the plurality of pixel groups, processing the pixels in the pixel group based on the global homography matrix and the correction matrix.

* * * * *